United States Patent
Ohhashi et al.

(10) Patent No.: US 8,736,125 B2
(45) Date of Patent: May 27, 2014

(54) COUPLING DEVICE AND METHOD OF MANUFACTURING COUPLING DEVICE

(75) Inventors: Hiromitsu Ohhashi, Takatsuki (JP); Junichi Sutani, Toyonaka (JP)

(73) Assignee: Hitachi Metals, Ltd., Tokyo (JP)

( * ) Notice: Subject to any disclaimer, the term of this patent is extended or adjusted under 35 U.S.C. 154(b) by 0 days.

(21) Appl. No.: 13/561,290

(22) Filed: Jul. 30, 2012

(65) Prior Publication Data

US 2012/0306306 A1 Dec. 6, 2012

Related U.S. Application Data

(63) Continuation of application No. PCT/JP2011/060961, filed on May 12, 2011.

(30) Foreign Application Priority Data

May 17, 2010 (JP) ................................ 2010-113320

(51) Int. Cl.
 *H02K 49/02* (2006.01)
(52) U.S. Cl.
 USPC .......................................... 310/105; 310/103
(58) Field of Classification Search
 USPC ............................... 310/105, 211, 20, 80, 103
 See application file for complete search history.

(56) References Cited

U.S. PATENT DOCUMENTS

| | | | |
|---|---|---|---|
| 3,974,408 A * | 8/1976 | Fehr et al. ..................... | 310/103 |
| 5,064,029 A | 11/1991 | Araki et al. | |
| 5,143,183 A | 9/1992 | Kuwahara | |
| 6,577,037 B2 | 6/2003 | Killen et al. | |
| 6,682,430 B2 | 1/2004 | Killen | |
| 7,488,271 B2 | 2/2009 | Inoue et al. | |
| 2002/0132671 A1 | 9/2002 | Killen | |
| 2004/0066107 A1* | 4/2004 | Gery ............................. | 310/103 |
| 2005/0189830 A1 | 9/2005 | Corbin et al. | |
| 2006/0208597 A1* | 9/2006 | Lee et al. ..................... | 310/211 |
| 2007/0205681 A1 | 9/2007 | Corbin | |
| 2008/0136189 A1* | 6/2008 | Qu et al. ......................... | 290/52 |
| 2010/0277021 A1 | 11/2010 | Corbin, III et al. | |

FOREIGN PATENT DOCUMENTS

| | | |
|---|---|---|
| JP | 01-298948 A | 12/1989 |
| JP | 02-103532 U | 8/1990 |
| JP | 03-074186 U | 7/1991 |
| JP | 04-088867 A | 3/1992 |
| JP | 07-131970 A | 5/1995 |
| JP | 08-135682 A | 5/1996 |

(Continued)

OTHER PUBLICATIONS

International Search Report of PCT/JP2011/060961; mailing date Jul. 26, 2011.

(Continued)

*Primary Examiner* — Hanh Nguyen
(74) *Attorney, Agent, or Firm* — Westerman, Hattori, Daniels & Adrian, LLP

(57) ABSTRACT

This coupling device includes a magnet rotator and a yoke-side member, while a conductor portion of the yoke-side member has a plurality of first conductor portions at least on a side opposed to magnets. A yoke of the yoke-side member is arranged at least on the side opposed to the magnets in a clearance between the plurality of first conductor portions. The ratio of the circumferential length of each of the first conductor portions to the circumferential length of the yoke is at least 1/1.4.

12 Claims, 15 Drawing Sheets

(56) References Cited

FOREIGN PATENT DOCUMENTS

| JP | 2003-023765 A | 1/2003 |
| JP | 2003-088090 A | 3/2003 |
| JP | 2004-524789 A | 8/2004 |
| JP | 2004-535147 A | 11/2004 |
| JP | 2006-162047 A | 6/2006 |
| JP | 2007-526738 A | 9/2007 |

OTHER PUBLICATIONS

Japanese Written Opinion of PCT/JP2011/060961; mailing date Jul. 26, 2011.

* cited by examiner

RELATIVE ROTATIONAL FREQUENCY-TORQUE MEASUREMENT

| RELATIVE ROTATIONAL FREQUENCY (ROTATIONAL FREQUENCY DIFFERENCE) (rpm(min⁻¹)) | TORQUE(N × m) ||
|---|---|---|
| | EXAMPLE1 | COMPARATIVE EXAMPLE1 |
| 90 | 16.5 | 6.0 |
| 180 | 29.6 | 11.8 |
| 450 | 48.3 | 27.3 |
| 900 | 49.2 | 45.2 |

TORQUE-JOULE LOSS MEASUREMENT

| EXAMPLE1 | | COMPARATIVE EXAMPLE1 | |
|---|---|---|---|
| TORQUE(N × m) | JOULE LOSS(W) | TORQUE(N × m) | JOULE LOSS(W) |
| 16.5 | 156.5 | 6.0 | 56.6 |
| 29.6 | 558.9 | 11.8 | 222.4 |
| 48.3 | 2273.5 | 27.3 | 1287.5 |
| | | 45.2 | 4269.4 |

RELATIVE ROTATIONAL FREQUENCY-JOULE LOSS MEASUREMENT

| RELATIVE ROTATIONAL FREQUENCY (ROTATIONAL FREQUENCY DIFFERENCE) (rpm(min$^{-1}$)) | JOULE LOSS(W) | |
|---|---|---|
| | EXAMPLE 1 | COMPARATIVE EXAMPLE 1 |
| 90 | 156.5 | 56.6 |
| 180 | 558.9 | 222.4 |
| 450 | 2273.5 | 1287.5 |
| 900 | 4535.7 | 4269.4 |

| RELATIVE ROTATIONAL FREQUENCY (ROTATIONAL FREQUENCY DIFFERENCE) (rpm(min⁻¹)) | TORQUE (N × m) | | | | | | | |
|---|---|---|---|---|---|---|---|---|
| | EXAMPLE2 (1:1.4) | EXAMPLE3 (1:1) | EXAMPLE4 (1.2:1) | EXAMPLE5 (1.4:1) | EXAMPLE6 (1.8:1) | EXAMPLE7 (2.1:1) | EXAMPLE8 (3.4:1) | COMPARATIVE EXAMPLE 2 |
| 0 | 0 | 0 | 0 | 0 | 0 | 0 | 0 | 0 |
| 50 | 1.24 | 1.44 | 1.50 | 1.50 | 1.45 | 1.36 | 1.06 | 0.62 |
| 100 | 2.36 | 2.76 | 2.88 | 2.90 | 2.83 | 2.65 | 2.04 | 1.22 |
| 500 | 7.91 | 8.93 | 9.27 | 9.47 | 9.49 | 9.26 | 7.90 | 5.45 |
| 1000 | 9.58 | 10.17 | 10.35 | 10.41 | 10.45 | 10.41 | 9.76 | 9.55 |

| RELATIVE ROTATIONAL FREQUENCY (ROTATIONAL FREQUENCY DIFFERENCE) (rpm(min⁻¹)) | TORQUE(N × m) | | |
|---|---|---|---|
| | EXAMPLE4 (1.7:1) | EXAMPLE9 (1:1) | COMPARATIVE EXAMPLE2 |
| 0 | 0 | 0 | 0 |
| 50 | 1.50 | 0.81 | 0.62 |
| 100 | 2.88 | 1.60 | 1.22 |
| 500 | 9.27 | 6.94 | 5.45 |
| 1000 | 10.35 | 10.26 | 9.55 |

RELATIVE ROTATIONAL FREQUENCY-TORQUE MEASUREMENT

| RELATIVE ROTATIONAL FREQUENCY (ROTATIONAL FREQUENCY DIFFERENCE) (rpm(min⁻¹)) | TORQUE(N × m) | | | |
|---|---|---|---|---|
| | Al ALLOY | | Cu ALLOY | |
| | EXAMPLE10 | COMPARATIVE EXAMPLE 3 | EXAMPLE 11 | COMPARATIVE EXAMPLE 4 |
| 90 | 17.9 | 4.3 | 26.0 | 6.5 |
| 180 | 31.4 | 8.0 | 41.5 | 12.1 |
| 450 | 49.6 | 18.7 | 51.1 | 27.8 |
| 900 | 49.2 | 33.8 | 44.4 | 46.0 |

TORQUE-JOULE LOSS MEASUREMENT

| Al ALLOY | | | |
|---|---|---|---|
| EXAMPLE 10 | | COMPARATIVE EXAMPLE 3 | |
| TORQUE(N×m) | JOULE LOSS(W) | TORQUE(N×m) | JOULE LOSS(W) |
| 17.9 | 168.9 | 4.3 | 37.0 |
| 31.4 | 591.5 | 8.0 | 145.7 |
| 49.6 | 2327.1 | 18.7 | 873.5 |
| | | 33.8 | 3167.3 |

| Cu ALLOY | | | |
|---|---|---|---|
| EXAMPLE 11 | | COMPARATIVE EXAMPLE 4 | |
| TORQUE(N×m) | JOULE LOSS(W) | TORQUE(N×m) | JOULE LOSS(W) |
| 26.0 | 244.9 | 6.5 | 57.6 |
| 41.5 | 783.6 | 12.1 | 225.7 |
| 51.1 | 2372.0 | 27.8 | 1306.5 |
| | | 46.0 | 4329.4 |

| RELATIVE ROTATIONAL FREQUENCY-JOULE LOSS MEASUREMENT |

| RELATIVE ROTATIONAL FREQUENCY (ROTATIONAL FREQUENCY DIFFERENCE) (rpm(min⁻¹)) | JOULE LOSS (W) | | | |
|---|---|---|---|---|
| | Al ALLOY | | Cu ALLOY | |
| | EXAMPLE 10 | COMPARATIVE EXAMPLE 3 | EXAMPLE 11 | COMPARATIVE EXAMPLE 4 |
| 90 | 168.9 | 37.0 | 244.9 | 57.6 |
| 180 | 591.5 | 145.7 | 783.6 | 225.7 |
| 450 | 2372.1 | 873.5 | 2372.0 | 1306.5 |
| 900 | 4616.5 | 3167.3 | 4144.5 | 4329.4 |

OFF-STATE

COUPLING DEVICE AND METHOD OF MANUFACTURING COUPLING DEVICE

CROSS-REFERENCE TO RELATED APPLICATIONS

The priority application numbers JP2010-113320, Coupling Device, May 17, 2010, Hiromitsu Ohhashi and Junichi Sutani, upon which this patent application is based are hereby incorporated by reference. This application is a continuation of PCT/JP2011/60961, Coupling Device, May 12, 2011, Hiromitsu Ohhashi and Junichi Sutani.

BACKGROUND OF THE INVENTION

1. Field of the Invention

The present invention relates to a coupling device and a method of manufacturing a coupling device, and more particularly, it relates to a coupling device including a magnet rotor and a yoke-side member coupled to the magnet rotor and a method of manufacturing a coupling device.

2. Description of the Background Art

A coupling device including a magnet rotor and a yoke-side member coupled to the magnet rotor is known in general, as disclosed in Japanese Patent Laying-Open No. 8-135682 (1996), for example.

Japanese Patent Laying-Open No. 8-135682 discloses a starting device (coupling device) including a discoidal (disk-shaped) driving member (magnet rotor) including a plurality of permanent magnets so arranged that different magnetic poles alternately line up in a circumferential direction and a discoidal driven member (yoke-side member) arranged to be opposed to the permanent magnets of the driving member. The driven member of the starting device described in Japanese Patent Laying-Open No. 8-135682 is constituted of a conductive member (conductor portion) provided with a plurality of through-holes on positions opposed to the permanent magnets and a core member (yoke), having projecting portions corresponding to the through-holes, arranged on a side of the conductive member opposite to the driving member. The core member passes through the through-holes of the conductive member so that end surfaces of the projecting portions approach the permanent magnets, thereby increasing the amount of magnetic flux passing through the projecting portions (through-holes) of the core member. Thus, the amount of eddy current flowing in the conductive member is so increased that a relatively high torque can be generated in the driven member. In order to generate a higher torque in the driven member, the amount of generated eddy current must conceivably be increased by increasing the areas of portions of the driving member and the driven member opposed to each other.

In the starting device disclosed in Japanese Patent Laying-Open No. 8-135682, however, both of the driving member and the driven member are discoidal, and hence the sizes of the discoidal driving member and the discoidal driven member must be both radially increased in order to increase the areas of the portions of the driving member and the driven member opposed to each other. Therefore, the size of the starting device disclosed in Japanese Patent Laying-Open No. 8-135682 is disadvantageously radially increased due to the radial increase of the sizes of the discoidal driving member and the discoidal driven member.

SUMMARY OF THE INVENTION

The present invention has been proposed in order to solve the aforementioned problem, and an object of the present invention is to provide a coupling device and a method of manufacturing a coupling device each allowing generation of a higher torque while suppressing radial size increase of the coupling device.

A coupling device according to a first aspect of the present invention includes a cylindrical magnet rotator including magnets so arranged that different magnetic poles alternately line up in a circumferential direction and a cylindrical yoke-side member, including a conductor portion made of a non-magnetic material and a yoke, arranged on the inner side or the outer side of the magnet rotor to be relatively rotatable in a state not in contact with the magnet rotor, while the conductor portion of the yoke-side member has a plurality of first conductor portions arranged to extend in a direction of the axis of rotation at a prescribed interval in the circumferential direction at least on a side opposed to the magnets, the yoke of the yoke-side member is at least arranged on the side opposed to the magnets in a clearance between the plurality of the first conductor portions, and the ratio between the circumferential length of each of the first conductor portions and the circumferential length of the yoke arranged in the clearance between the first conductor portions (circumferential length of each first conductor portion/circumferential length of yoke) is at least 1/1.4.

As hereinabove described, the coupling device according to the first aspect of the present invention is provided with the cylindrical magnet rotator including the magnets and the cylindrical yoke-side member arranged on the inner side or the outer side of the magnet rotor to be relatively rotatable in the state not in contact with the magnet rotor, whereby areas of portions of the magnet rotor and the yoke-side member opposed to each other can be increased by forming both of the cylindrical yoke-side member and the cylindrical magnet rotator to extend in the direction of the axis of rotation. Thus, the sizes of the magnet rotator and the yoke-side member may not be radially increased in order to increase the areas of the portions of the magnet rotator and the yoke-side member opposed to each other, whereby the coupling device can be inhibited from being radially increased in size for generating a higher torque.

Further, the yoke is so arranged on the side opposed to the magnets in the clearance between the plurality of first conductor portions that the same can more approach the magnets as compared with a case where the conductor portion is provided on the side opposed to the magnets to cover the whole yoke. Thus, the amount of magnetic flux generated in the yoke can be increased, whereby the amount of eddy current flowing in the first conductor portions can be increased. In addition, the ratio between the circumferential length of each of the first conductor portions and the circumferential length of the yoke (circumferential length of each first conductor portion/circumferential length of yoke) is so set to at least 1/1.4 that sectional areas of the first conductor portions in the circumferential direction can be increased, whereby electric resistance of the first conductor portions can be reduced. Thus, the amount of the eddy current flowing in the first conductor portions can be increased. In a case of a transmission system transmitting rotational force to the yoke-side member through eddy current, therefore, a torque generated in the yoke-side member can be increased. In a case of a braking system generating braking force in the yoke-side member through eddy current, on the other hand, the amount of generated Joule heat (Joule loss) can be increased, whereby the coupling device can generate higher braking force.

In the aforementioned coupling device according to the first aspect, the ratio between the circumferential length of each of the first conductor portions and the circumferential length of the yoke arranged in the clearance between the first conductor portions is preferably not more than 3.4/1. If the ratio between the circumferential length of each of the first conductor portions and the circumferential length of the yoke is greater than 3.4/1, the amount of magnetic flux passing through the clearance between the first conductor portions does not increase beyond a prescribed value due to saturation of magnetic flux, generated from the magnets, in the yoke. Therefore, the amount of eddy current generated in the yoke-side member (first conductor portions) is reduced. When the ratio between the circumferential length of each of the first conductor portions and the circumferential length of the yoke is set to not more than 3.4/1 as described above, on the other hand, the magnetic flux generated from the magnets can be inhibited from being saturated in the yoke, whereby the amount of the eddy current flowing in the first conductor portions can be inhibited from reduction.

In this case, the ratio between the circumferential length of each of the first conductor portions and the circumferential length of the yoke arranged in the clearance between the first conductor portions is preferably at least 1/1 and not more than 2.1/1. According to this structure, the torque and the amount of Joule heat can be more increased, and the amount of the eddy current flowing in the first conductor portions can be more inhibited from reduction.

In the aforementioned coupling device exhibiting the ratio between the circumferential lengths set to at least 1/1 and not more than 2.1/1, the ratio between the circumferential length of each of the first conductor portions and the circumferential length of the yoke arranged in the clearance between the first conductor portions is preferably at least 1.2/1 and not more than 1.8/1. According to this structure, the torque and the amount of Joule heat can be more increased, and the amount of the eddy current flowing in the first conductor portions can be effectively inhibited from reduction.

In the aforementioned coupling device according to the first aspect, the radial thickness of the first conductor portions is preferably in excess of the radial thickness of the magnets. According to this structure, sectional areas of the first conductor portions in the circumferential direction can be increased, whereby electric resistance of the first conductor portions can be reduced. Thus, the amount of the eddy current flowing in the first conductor portions can be increased.

In the aforementioned coupling device according to the first aspect, the plurality of first conductor portions are preferably formed to extend in the direction of the axis of rotation in a state arranged at substantially equal intervals in the circumferential direction. According to this structure, eddy current generated in each of the plurality of first conductor portions can be fed along the direction of the axis of rotation in a substantially uniform state, whereby a substantially uniform torque and substantially uniform Joule heat can be generated not only in the circumferential direction but also in the direction of the axis of rotation.

In the aforementioned coupling device according to the first aspect, the conductor portion of the yoke-side member preferably further has an annular second conductor portion arranged on end portions of the plurality of first conductor portions in the direction of the axis of rotation for connecting the plurality of first conductor portions with each other. According to this structure, the second conductor portion can electrically connect the plurality of first conductor portions with each other. Thus, eddy current can be generated between different ones of the first conductor portions. Further, the second conductor portion is arranged on the end portions of the plurality of first conductor portions in the direction of the axis of rotation, whereby the length in the direction of the axis of rotation where the eddy current flows can be increased as compared with a case where no second conductor portion is arranged on the end portions. Thus, a torque and Joule heat can be generated in the yoke-side member in a wider range in the direction of the axis of rotation, whereby the torque and the amount of Joule heat in the yoke-side member can be further increased.

In this case, the second conductor portions are preferably arranged on both end portions of the first conductor portions in the direction of the axis of rotation respectively. According to this structure, the second conductor portions provided on both end portions respectively connect the plurality of first conductor portions with each other, whereby the coupling device can be so formed that eddy current flows between different ones of the first conductor portions and the second conductor portions provided on both end portions. Thus, a torque and Joule heat can be generated in the yoke-side member in a wider range in the direction of the axis of rotation.

In the aforementioned coupling device including the conductor portion having the second conductor portion, the second conductor portion is preferably formed integrally with the plurality of first conductor portions. According to this structure, contact resistance between the plurality of first conductor portions and the second conductor portion can be reduced, whereby higher eddy current can be generated in the conductor portion.

In the aforementioned coupling device according to the first aspect, a plurality of groove portions or a plurality of hole portions are preferably formed in the vicinity of a surface of the yoke opposed to the magnets to extend in the direction of the axis of rotation, and each of the plurality of first conductor portions is preferably arranged in each of the plurality of groove portions or the plurality of hole portions. According to this structure, the plurality of first conductor portions extending in the direction of the axis of rotation at the prescribed interval in the circumferential direction can be easily formed by simply arranging each of the plurality of first conductor portions in each of the plurality of groove portions or the plurality of hole portions extending in the direction of the axis of rotation.

In the aforementioned coupling device according to the first aspect, at least either the magnet rotator or the yoke-side member is preferably formed to be capable of changing the areas of portions of the magnets of the magnet rotator and the yoke-side member opposed to each other. According to this structure, increase/decrease of the amount of the eddy current flowing in the first conductor portions can be so varied that a torque and Joule heat in the coupling device can be more correctly controlled by controlling the magnitude of the eddy current.

In this case, either the magnet rotator or the yoke-side member is preferably formed to change the areas of the portions of the magnets of the magnet rotator and the yoke-side member opposed to each other by moving with respect to either the yoke-side member or the magnet rotator in the direction of the axis of rotation. According to this structure, the areas of the portions of the magnets of the magnet rotator and the yoke-side member opposed to each other can be easily varied.

A method of manufacturing a coupling device according to a second aspect of the present invention is a method of manufacturing a coupling device including a cylindrical magnet rotator including magnets so arranged that different magnetic poles alternately line up in a circumferential direction and a cylindrical yoke-side member, including a conductor portion made of a nonmagnetic material and a yoke, arranged on the inner side or the outer side of the magnet rotator to be relatively rotatable in a state not in contact with the magnet rotor, including steps of preparing a plurality of discoidal yoke plate members each provided with a plurality of outer holes in the vicinity of the outer periphery thereof, forming a cylindrical yoke extending in a direction of the axis of rotation so that a hole portion constituted of the outer holes extends in the direction of the axis of rotation by stacking the plurality of yoke plate members, and forming the yoke-side member by forming a plurality of first conductor portions of the conductor portion made of the nonmagnetic material in the hole portion of the yoke.

In the method of manufacturing a coupling device according to the second aspect of the present invention, as hereinabove described, the yoke-side member is formed by forming the plurality of first conductor portions of the conductor portion made of the nonmagnetic material in the hole portion of the cylindrical yoke so that both of the cylindrically formed yoke-side member and the cylindrical magnet rotor can be arranged to extend in the direction of the axis of rotation, whereby areas of portions of the magnet rotor and the yoke-side member opposed to each other can be increased. Thus, the sizes of the magnet rotor and the yoke-side member may not be radially increased in order to increase the areas of the portions of the magnet rotor and the yoke-side member opposed to each other, whereby the coupling device can be inhibited from being radially increased in size for generating a higher torque.

Further, the plurality of first conductor portions of the conductor portion made of the nonmagnetic material are formed in the hole portion of the yoke, whereby the yoke can more approach the magnets as compared with a case where the conductor portion is provided on the side opposed to the magnets to cover the whole yoke. Thus, the amount of magnetic flux generated in the yoke can be increased, whereby the amount of eddy current flowing in the first conductor portions can be increased. In a case of a transmission system transmitting rotational force to the yoke-side member through eddy current, therefore, a torque generated in the yoke-side member can be increased. In a case of a braking system generating braking force in the yoke-side member through eddy current, on the other hand, the amount of generated Joule heat (Joule loss) can be increased, whereby the coupling device can generate higher braking force.

In the aforementioned method of manufacturing a coupling device according to the second aspect, the step of forming the yoke-side member preferably includes a step of casting the plurality of first conductor portions of the conductor portion made of the nonmagnetic material by casting the nonmagnetic material into the hole portion of the yoke. According to this structure, the plurality of first conductor portions of the conductor portion made of the nonmagnetic material can be easily provided on the yoke-side member.

The foregoing and other objects, features, aspects and advantages of the present invention will become more apparent from the following detailed description of the present invention when taken in conjunction with the accompanying drawings.

DESCRIPTION OF THE PREFERRED EMBODIMENTS

Embodiments of the present invention are now described with reference to the drawings.

First Embodiment

First, the structure of a coupling device 1 according to a first embodiment of the present invention is described with reference to FIGS. 1 to 3.

Figure 1:
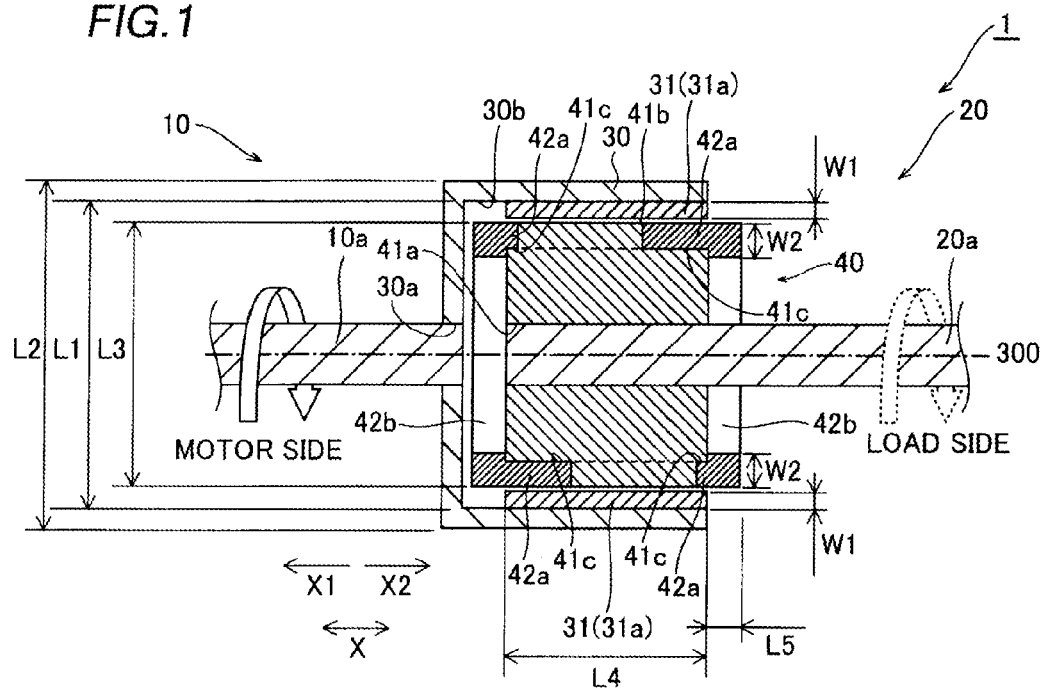
FIG. 1 is a sectional view showing a coupling device according to a first embodiment of the present invention.

The coupling device 1 according to the first embodiment of the present invention is formed by a magnet-side portion 10 and a yoke-side portion 20, as shown in FIG. 1. The magnet-side portion 10 includes a shaft portion 10a having a first end portion (along arrow X1) connected to a motor (not shown) and a magnet-side rotator 30 provided on a second end portion (along arrow X2) of the shaft portion 10a. The yoke-side portion 20 includes a shaft portion 20a having a first end portion (along arrow X2) connected to a load portion (not shown) formed by a driving portion or the like and a yoke-side member 40 provided on a second end portion of the shaft portion 20a. In other words, the magnet-side portion 10 is connected to the side of the motor, while the yoke-side portion 20 is connected to the side of the load portion. The shaft portions 10a and 20a are formed to rotate on a substantially identical axis 300 of rotation extending in a direction X. The magnet-side rotator 30 is an example of the "magnet rotator" in the present invention.

The magnet-side portion 10 may be connected not to the side of the motor but to the side of the load portion, while the yoke-side portion 20 may be connected not to the side of the load portion but to the side of the motor. The following description is made on the premise that the magnet-side portion 10 is connected to the side of the motor and the yoke-side portion 20 is connected to the side of the load portion.

The magnet-side rotator 30 is made of a ferromagnetic material such as general carbon steel such as SS400, and has a portion provided in the form of a concave cylinder along arrow X2. The magnet-side rotator 30 has a shaft hole portion 30a receiving the shaft portion 10a. The coupling device 1 is so formed that the shaft portion 10a is so inserted into the shaft hole portion 30a that the magnet-side rotator 30 also rotates on the axis 300 of rotation following rotation of the shaft portion 10a. The inner diameter L1 of a concave inner peripheral surface 30b of the magnet-side rotator 30 is about 90 mm, while the outer diameter L2 of the magnet-side rotator 30 is about 102 mm.

Figure 2:
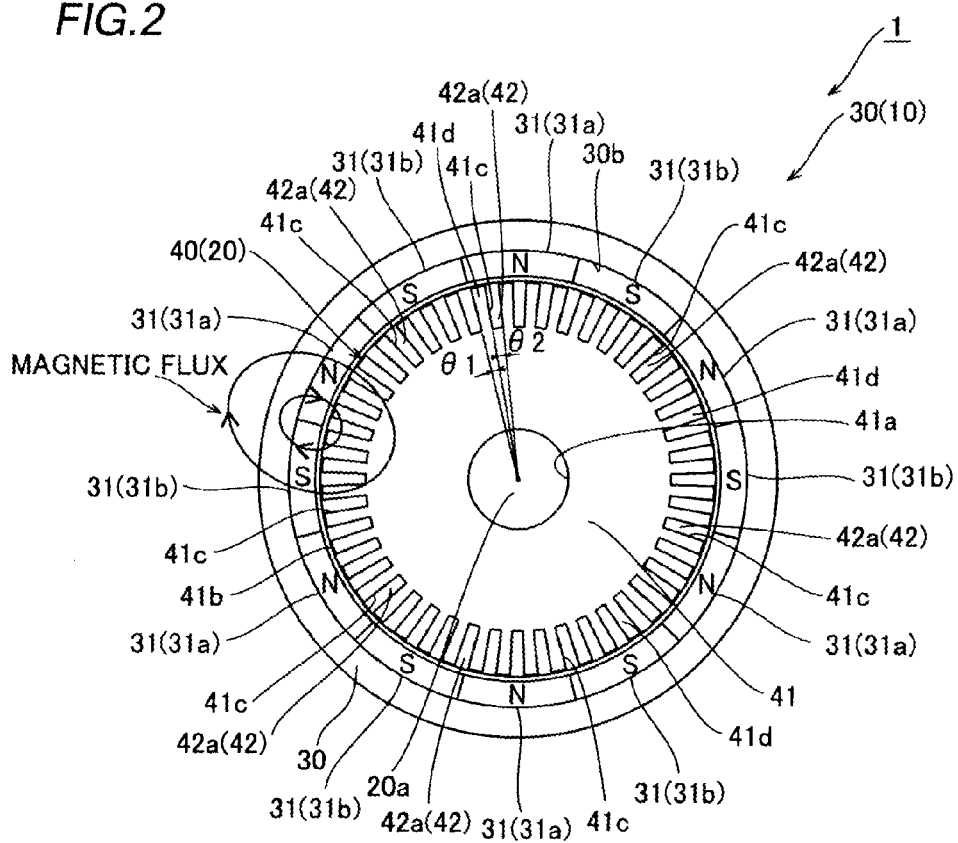
FIG. 2 is a plan view of the coupling device according to the first embodiment of the present invention as viewed along arrow X2 in FIG. 1.

As shown in FIG. 2, 12 magnets 31 are so arranged on the magnet-side rotator 30 that different magnetic poles alternately line up along the circumferential direction of the concave inner peripheral surface 30b. The 12 magnets 31 are arranged to extend parallelly to the axis 300 of rotation, as shown in FIG. 1.

More specifically, the 12 magnets 31 are constituted of magnets 31a having north poles arranged on the side of the axis 300 (see FIG. 1) of rotation and magnets 31b having south poles arranged on the side of the axis 300 of rotation, as shown in FIG. 2. The magnets 31a and 31b are arranged to alternately line up on the concave inner peripheral surface 30b of the magnet-side rotator 30 along the circumferential direction at substantially equiangular intervals (about 30°). FIG. 2 illustrates only the magnetic poles on the side of the axis 300 of rotation, and omits illustration of a short-circuit portion 42b, described later, along arrow X2. The 12 magnets 31 have a radial thickness W1 of about 5 mm, as shown in FIG. 1. The coupling device 1 is so formed that magnetic flux flows between the magnets 31a and the magnets 31b adjacent thereto, as shown in FIG. 2.

The yoke-side member 40 is formed to be rotatable on the axis 300 of rotation, and provided in the form of a cylinder. Further, the yoke-side member 40 is arranged on the inner side of the magnet-side rotator 30 provided with the 12 magnets 31, and formed to be relatively rotatable while being coupled to the magnet-side rotator 30 at a prescribed interval in a state not in contact with the magnet-side rotator 30. The interval (clearance) between the yoke-side member 40 and the magnet-side rotator 30 is about 1 mm.

The yoke-side member 40 is constituted of a yoke 41 formed by stacking silicon steel plates and a conductor portion 42 made of an alloy mainly containing Al or Cu, which is a nonmagnetic material. The silicon steel plates are made of an Si-containing Fe alloy, which is a ferromagnetic material easily transmitting magnetic flux (having high magnetic permeability). The yoke 41 is provided in the form of a cylinder having an outer diameter L3 of about 78 mm and a length L4 of about 60 mm in the direction X, as shown in FIG. 1. The yoke 41 has a shaft hole portion 41a receiving the shaft portion 20a. The coupling device 1 is so formed that the shaft portion 20a is so inserted into the shaft hole portion 41a that the yoke 41 (yoke-side member 40) also rotates on the axis 300 of rotation following rotation of the shaft portion 20a. An outer peripheral surface 41b of the yoke 41 is arranged to be opposed to the 12 magnets 31 arranged on the inner peripheral surface 30b of the magnet-side rotator 30.

As shown in FIG. 2, 44 groove portions 41c are arranged on the outer peripheral surface 41b of the yoke 41 at substantially equal angles (about 8.2°), and formed to extend in the extensional direction (direction X in FIG. 1) of the axis 300 of rotation. In other words, the coupling device 1 is so formed that 44 projecting portions 41d provided with no groove portions 41c are positioned in clearances between the groove portions 41c respectively. The projecting portions 41d are sectorially formed in plan view, and the coupling device 1 is so formed that an angle θ1 between both outer side surfaces of each sectorial projecting portion 41d is about 3.7°. Further, the coupling device 1 is so formed that an angle θ2 between both inner side surfaces of each groove portion 41c is about 4.5°. Thus, the coupling device 1 is so formed that the length of the outer periphery of each projecting portion 41d is about 0.802 mm (78 mm×3.7°/360° and the length of the outer periphery of a portion provided with each groove portion 41c is about 0.975 mm (78 mm×4.5°/360°. In other words, the coupling device 1 is so formed that the length of the outer periphery of each groove portion 41c is about 1.2 times the length of the outer periphery of each projecting portion 41d.

Figure 3:
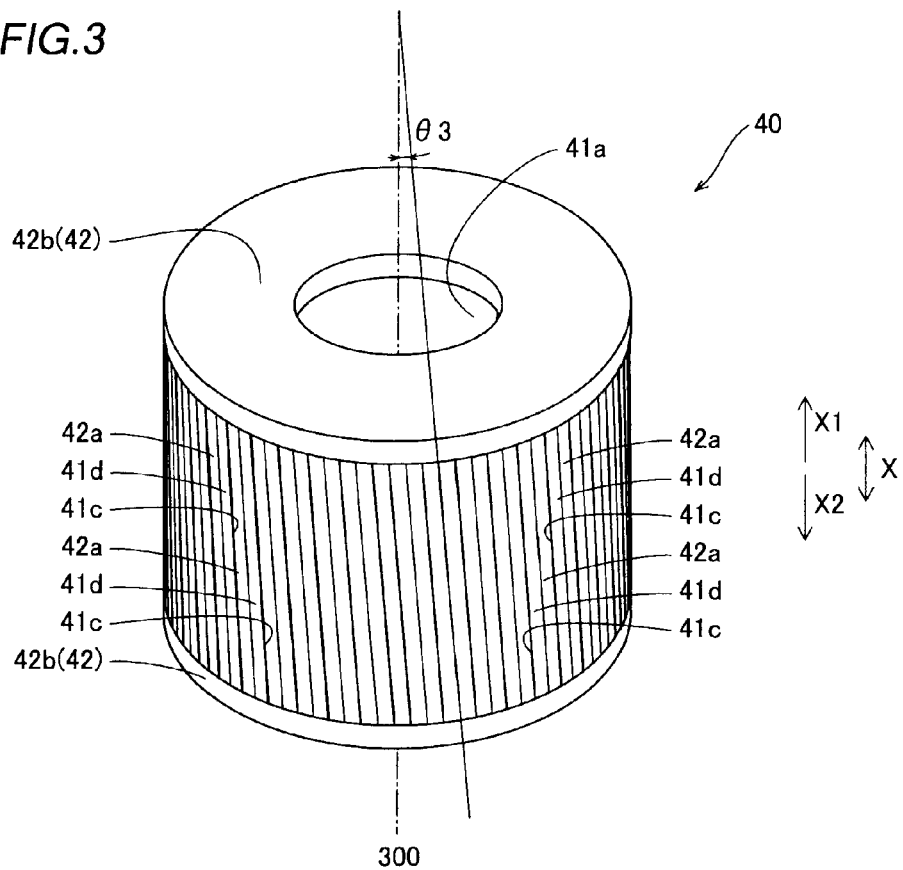
FIG. 3 is a perspective view showing a load-side rotator of the coupling device according to the first embodiment of the present invention.

As shown in FIG. 3, the coupling device 1 is so formed that the 44 groove portions 41c are inclined (skewed) with respect to the axis 300 of rotation extending in the direction X at an angle θ3. The 44 groove portions 41c have a radial depth of about 9 mm.

According to the first embodiment, the conductor portion 42 is constituted of 44 axial conductor portions 42a (see FIG. 2) arranged on the 44 groove portions 41c of the yoke 41 respectively and a pair of short-circuit portions 42b formed on both end portions of the yoke 41 and the axial conductor portions 42a in the direction X respectively. The axial conductor portions 42a are formed to extend in the extensional direction (direction X) of the axis 300 of rotation. The axial conductor portions 42a are examples of the "first conductor portions" in the present invention, and the short-circuit portions 42b are examples of the "second conductor portion" in the present invention.

The axial conductor portions 42a are arranged from the vicinity of the outer peripheral surface 41b of the yoke 41 up to bottom portions of the groove portions 41c on the side of the axis 300 of rotation respectively, as shown in FIG. 2. Thus, the conductor portion 42 has a thickness W2 (see FIG. 1) of about 9.0 mm in the radial direction. Therefore, the coupling device 1 is so formed that the radial thickness W2 (about 9.0 mm) of the conductor portion 42 is about 1.8 times the radial thickness W1 (about 5.0 mm) of the magnets 31. Further, the coupling device 1 is so formed that the length (about 0.975 mm) of the outer periphery of each groove portion 41c where the corresponding axial conductor portion 42a is arranged is about 1.2 times the length (about 0.802 mm) of the outer periphery of each projecting portion 41d of the yoke 41 as described above, whereby the length of the outer periphery of each axial conductor portion 42a is about 1.2 times the length of the outer periphery of each projecting portion 41d of the yoke 41.

As shown in FIG. 3, the coupling device 1 is so formed that the 44 groove portions 41c are inclined with respect to the axis 300 of rotation extending in the direction X at the angle θ3, whereby the 44 axial conductor portions 42a are also inclined with respect to the axis 300 of rotation extending in the direction X at the angle θ3. The projecting portions 41d of the yoke 41 are arranged between the 44 axial conductor portions 42a arranged on the 44 groove portions 41c.

The pair of short-circuit portions 42b are arranged on end portions of the 44 axial conductor portions 42a along arrows X1 and X2 respectively. In other words, the pair of short-circuit portions 42b are arranged to hold the 44 axial conductor portions 42a and the yoke 41 therebetween from both sides in the direction X. Further, the pair of short-circuit portions 42b are annularly formed to connect the 44 axial conductor portions 42a with each other in the circumferential direction. The 44 axial conductor portions 42a and the pair of short-circuit portions 42b are integrally formed. The radial thickness L5 (see FIG. 1) of the pair of short-circuit portions 42b is about 10 mm.

The coupling device 1 is so formed that magnetic flux from the magnets 31 changes on the projecting portions 41d of the yoke 41 upon rotation of the magnet-side rotator 30. Further, the coupling device 1 is so formed that eddy current is generated in the 44 axial conductor portions 42a and the pair of short-circuit portions 42b on the basis of this change of the magnetic flux. In addition, the coupling device 1 is so formed that force acting in the same direction of rotation as that of the magnet-side rotator 30 is applied to each of the 44 axial conductor portions 42a due to the eddy current to relatively rotate the yoke-side member 40 in the same direction of rotation as the magnet-side rotator 30 in the state not in contact with the magnet-side rotator 30. At this time, rotational frequency difference (relative rotational frequency) is caused between the rotational frequencies of the magnet-side rotator 30 and the yoke-side member 40, thereby causing difference between energy supplied from the magnet-side rotator 30 and that transmitted to the yoke-side member 40. Energy corresponding to this difference is converted to force and heat, thereby generating a torque and Joule heat in the yoke-side member 40.

However, the yoke-side member 40 may not rotate with respect to the magnet-side rotator 30 when the force acting in the same direction of rotation as that of the magnet-side rotator 30 is applied to each of the 44 axial conductor portions 42a due to the eddy current. The coupling device 1 is so formed that Joule heat is generated in the yoke-side member 40 in this case.

The coupling device 1 is so formed that the eddy current flows through a loop-shaped path constituted of two axial conductor portions 42a and the pair of short-circuit portions 42b.

A method of manufacturing the yoke-side member 40 of the coupling device 1 according to the first embodiment of the present invention is now described with reference to FIGS. 3 to 7.

Figure 4:
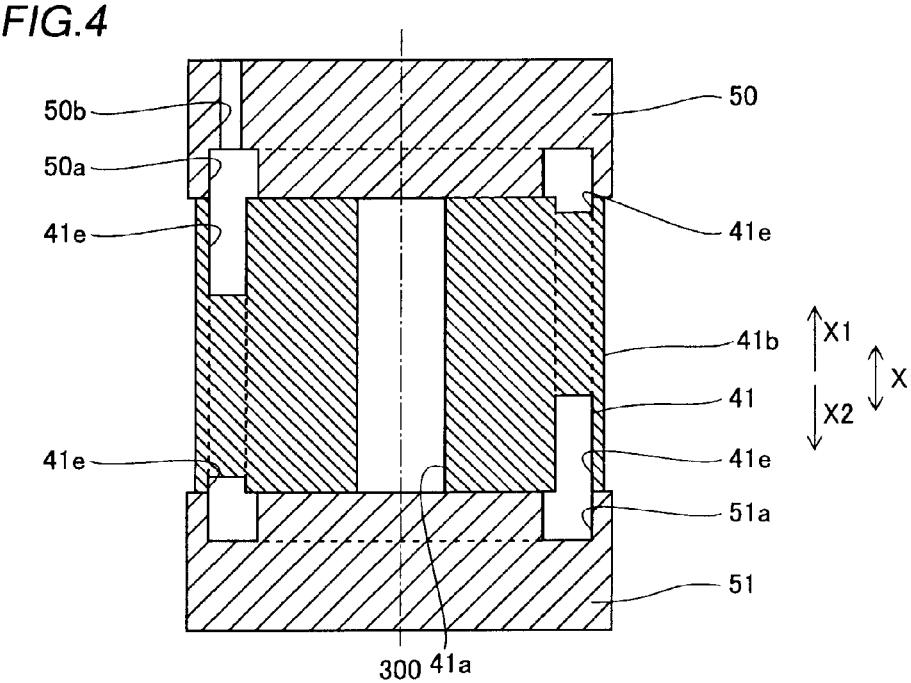
FIG. 4 is a sectional view showing a state of stacking a yoke in a step of manufacturing a load-side rotating portion of the coupling device according to the first embodiment of the present invention.

First, discoidal silicon steel plates (not shown) each having a thickness of about 0.5 mm are prepared. Each discoidal silicon steel plate has a central hole, corresponding to the axial hole portions 41a, provided at the center thereof and 44 outer holes, corresponding to the 44 groove portions 41c, provided in the vicinity of the outer periphery thereof. Then, about 120 discoidal silicon steel plates are so stacked as to form the cylindrical yoke 41 having the shaft hole portion 41a and extending in the extensional direction (direction X) of the axis 300 of rotation, as shown in FIG. 4. At this time, the silicon steel plates are so stacked that 44 hole portions 41e constituted of the outer holes of about 120 silicon steel plates are inclined with respect to the axis 300 of rotation extending in the direction X at the angle θ3 (see FIG. 3). The silicon steel plates are examples of the "yoke plate members" in the present invention.

Thereafter dies 50 and 51 are arranged on the sides of the yoke 41 along arrows X1 and X2 respectively. The dies 50 and 51 are provided with die faces 50a and 51a for forming the short-circuit portions 42b along arrows X1 and X2 respectively. Further, the die 50 is provided with an injection hole 50b for injecting the alloy containing Al or Cu into the die faces 50a and 51a and the hole portions 41e of the yoke 41.

Figure 5:
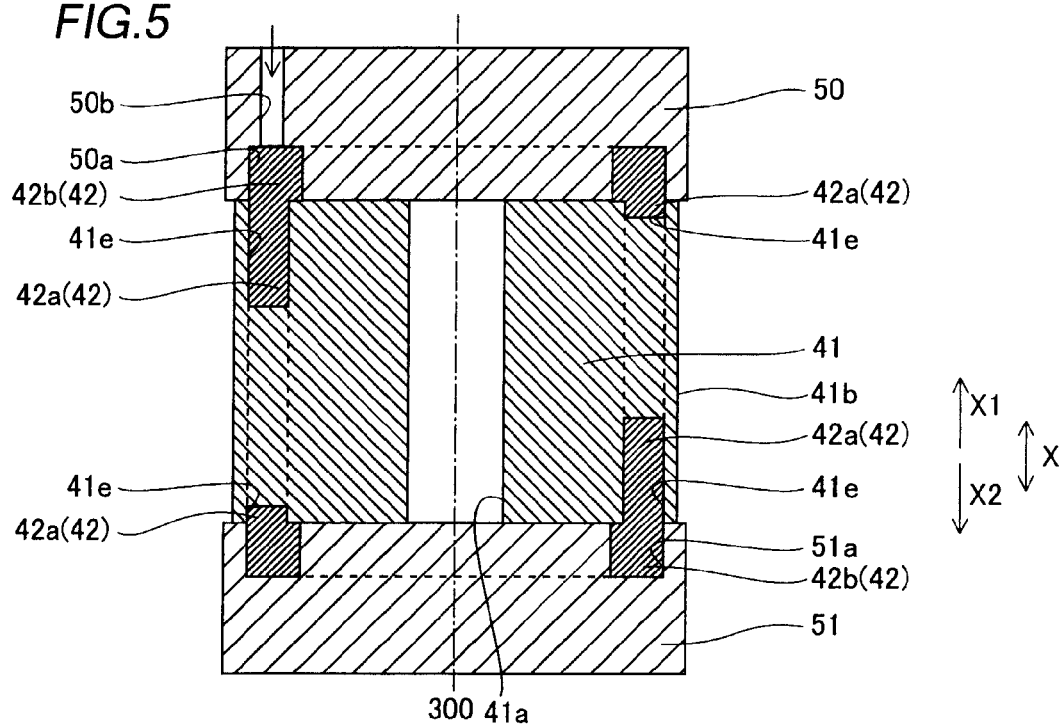
FIG. 5 is a sectional view showing a state of die-casting a conductor portion in another step of manufacturing the load-side rotating portion of the coupling device according to the first embodiment of the present invention.

Then, the alloy, containing Al or Cu, heated to at least about 700° C. and not more than about 800° C. is injected into the die faces 50a and 51a and the hole portions 41e of the yoke 41 through the injection hole 50b as shown in FIG. 5, thereby casting the conductor portion 42 made of the alloy containing Al or Cu. At this time, the 44 axial conductor portions 42a of the conductor portion 42 are formed in the 44 hole portions 41e respectively, while the pair of short-circuit portions 42b of the conductor portion 42 are formed on the die faces 50a and 51a respectively. Thus, the 44 axial conductor portions 42a and the pair of short-circuit portions 42b are integrally formed.

Figure 6:
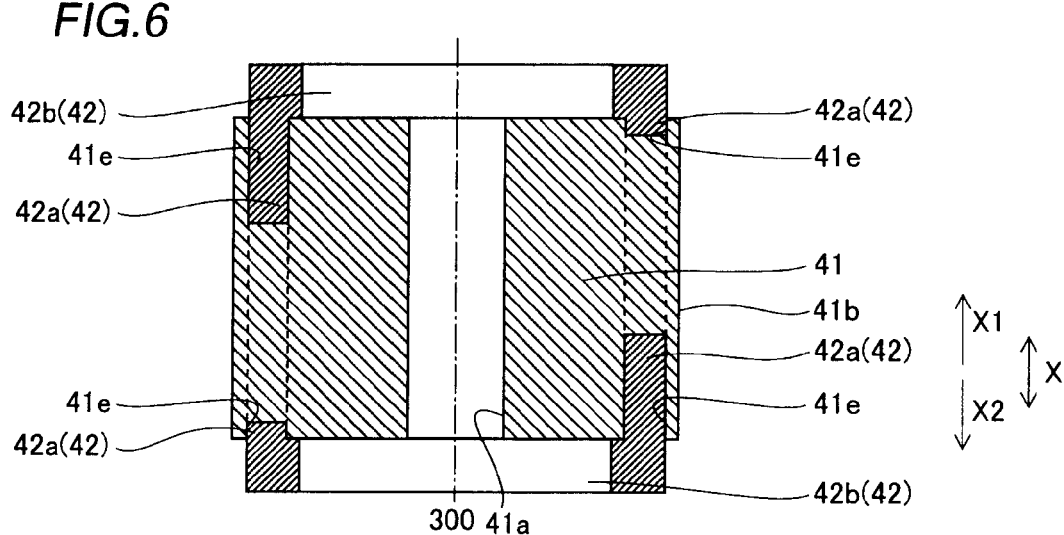
FIG. 6 is a sectional view showing a state of removing a die in still another step of manufacturing the load-side rotating portion of the coupling device according to the first embodiment of the present invention.
Figure 7:
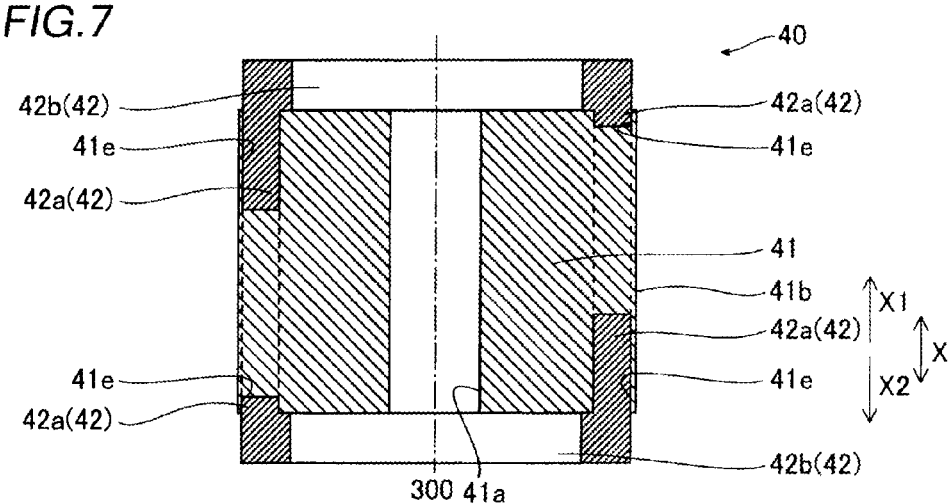
FIG. 7 is a sectional view showing a state of cutting the outer peripheral surface of the yoke in a further step of manufacturing the load-side rotating portion of the coupling device according to the first embodiment of the present invention.

Thereafter the dies 50 and 51 are detached from the sides of the yoke 41 along arrows X1 and X2 respectively, as shown in FIG. 6. Then, the outer peripheral surface 41b of the yoke 41 is cut by a prescribed amount for partially cutting the side surfaces of the 44 hole portions 41e, thereby forming the 44 groove portions 41c where the axial conductor portions 42a are individually arranged, as shown in FIG. 7. The yoke-side member 40 is formed in this manner.

According to the first embodiment, as hereinabove described, the coupling device 1 is provided with the cylindrical magnet-side rotator 30 including the 12 magnets 31 and the cylindrical yoke-side member 40 arranged on the inner side of the magnet-side rotator 30 to be covered with the concave inner peripheral surface 30b of the magnet-side rotator 30 and formed to be relatively rotatable in the state not in contact with the magnet-side rotator 30. Further, both of the magnet-side rotator 30 and the yoke-side member 40 are formed to extend in the extensional direction of the axis 300 of rotation and formed to rotate on the substantially identical axis 300 of rotation, whereby the areas of the portions of the magnet-side rotator 30 and the yoke-side member 40 opposed to each other can be increased. Thus, the sizes of the magnet-side rotator 30 and the yoke-side member 40 may not be increased in the radial direction in order to increase the areas of the portions of the magnet-side rotator 30 and the yoke-side member 40 opposed to each other, whereby the size of the coupling device 1 can be inhibited from being increased in the radial direction for generating a higher torque.

According to the first embodiment, as hereinabove described, the projecting portions 41d positioned on the side of the outer peripheral surface 41b of the yoke 41 are arranged on the side opposed to the 12 magnets 31, and arranged on between the 44 axial conductor portions 42a (groove portions 41c), whereby the yoke 41 can more approach the 12 magnets 31 as compared with a case where the conductor portion 42 is provided on the side of the outer peripheral surface 41b of the yoke 41 to cover the overall yoke 41. Thus, the amount of the magnetic flux generated in the yoke 41 can be further increased, whereby the amount of the eddy current flowing in the axial conductor portions 42a can be further increased. In a case of a transmission system transmitting rotational force to the yoke-side member 40 through the eddy current, therefore, the torque generated in the yoke-side member 40 can be further increased. In a case of a braking system generating braking force in the yoke-side member 40 through the eddy current, on the other hand, the amount of generated Joule heat (Joule loss) can be further increased, whereby the coupling device 1 can generate higher braking force.

According to the first embodiment, as hereinabove described, the 44 axial conductor portions 42a are formed to extend in the extensional direction oft the axis 300 of rotation in the state arranged at substantially equal angles (about 8.2°) in the circumferential direction so that the eddy current generated in the 44 axial conductor portions 42a can be fed along the extensional direction of the axis 300 of rotation in a substantially uniform state, whereby a substantially uniform torque and substantially uniform Joule heat can be generated not only in the circumferential direction but also in the extensional direction of the axis 300 of rotation.

According to the first embodiment, as hereinabove described, the coupling device 1 is so formed that the length (about 0.975 mm) of the outer peripheries of the axial conductor portions 42a is about 1.2 times the length (about 0.802 mm) of the outer peripheries of the projecting portions 41d of the yoke 41 so that sectional areas of the axial conductor portions 42a in the circumferential direction can be increased as compared with a case where the ratio between the length of the outer peripheries of the axial conductor portions 42a and that of the outer peripheries of the projecting portions 41d of the yoke 41 is set to be smaller than 1/1.4, whereby electric resistance of the axial conductor portions 42a can be reduced. Thus, the amount of the eddy current flowing in the axial conductor portions 42a can be increased, whereby the torque and the amount of the Joule heat can be more increased.

According to the first embodiment, as hereinabove described, the coupling device 1 is so formed that the length of the outer peripheries of the axial conductor portions 42a is about 1.2 times the length of the outer peripheries of the projecting portions 41d of the yoke 41 so that the magnetic flux generated from the 12 magnets 31 can be inhibited from being saturated on the projecting portions 41d of the yoke 41 as compared with a case where the ratio between the length of the outer peripheries of the axial conductor portions 42a and that of the outer peripheries of the projecting portions 41d of the yoke 41d is set to be greater than 3.4/1, whereby the amount of the eddy current flowing in the axial conductor portions 42a can be inhibited from reduction.

According to the first embodiment, as hereinabove described, the radial thickness W2 (about 9.0 mm) of the axial conductor portions 42a is set to about 1.8 times the radial thickness W1 (about 5.0 mm) of the magnets 31 so that the sectional areas of the axial conductor portions 42a in the circumferential direction can be increased, whereby the electric resistance of the axial conductor portions 42a can be reduced. Thus, the amount of the eddy current flowing in the axial conductor portions 42a can be increased.

According to the first embodiment, as hereinabove described, the pair of annular short-circuit portions 42b are arranged on the end portions of the 44 axial conductor portions 42a along arrows X1 and X2 respectively, whereby the loop-shaped path can be constituted of a pair of axial conductor portions 42a and the pair of short-circuit portions 42b. Thus, the eddy current can be generated between different ones of the axial conductor portions 42a. Further, the pair of short-circuit portions 42b are so arranged on the end portions of the 44 axial conductor portions 42a along arrows X1 and X2 respectively that the length in the extensional direction of the axis 300 of rotation where the eddy current flows can be more increased as compared with a case where the pair of short-circuit portions 42a are not arranged on the end portions in the direction X. Thus, the torque and the Joule heat can be generated in the yoke-side member 40 in a wider range in the extensional direction of the axis 300 of rotation, whereby the torque and the amount of the Joule heat in the yoke-side member 40 can be more increased. In addition, the pair of short-circuit portions 42b are so arranged on the end portions of the 44 axial conductor portions 42a along arrows X1 and X2 respectively that the coupling device 1 can be so formed that the eddy current flows between different ones of the axial conductor portions 42a and the short-circuit portions 42b on the end portions. Thus, the torque and the Joule heat can be generated in the yoke-side member 40 in a wider range in the extensional direction of the axis 300 of rotation.

According to the first embodiment, as hereinabove described, contact resistance between the 44 axial conductor portions 42a and the pair of short-circuit portions 42b can be reduced by integrally forming the 44 axial conductor portions 42a and the pair of short-circuit portions 42b, whereby higher eddy current can be generated in the conductor portion 42.

According to the first embodiment, as hereinabove described, the 44 groove portions 41c are formed on the outer peripheral surface 41b of the yoke 41 to extend in the extensional direction (direction X) of the axis 300 of rotation while the 44 axial conductor portions 42a are arranged in the 44 groove portions 41c respectively, whereby the 44 axial conductor portions 42a extending in the extensional direction of the axis 300 of rotation at a prescribed interval in the circumferential direction can be easily formed by simply arranging the 44 axial conductor portions 42a in the 44 groove portions 41c extending in the extensional direction of the axis 300 of rotation respectively.

According to the first embodiment, as hereinabove described, the coupling device 1 is so formed that the conductor portion 42 is made of the alloy mainly containing Al which is the nonmagnetic material and the yoke 41 is formed by stacking the silicon steel plates, whereby the amount of the eddy current flowing in the axial conductor portions 42a can be further increased by employing the alloy containing Al which is the nonmagnetic material and the Fe alloy containing Si which is the ferromagnetic material having high magnetic permeability. Al has a lower melting point than Cu which is also the nonmagnetic material, whereby the conductor portion 42 can be more easily formed by casting or the like.

According to the first embodiment, as hereinabove described, the coupling device 1 is so formed that the conductor portion 42 is made of the alloy mainly containing Cu which is the nonmagnetic material and the yoke 41 is formed by stacking the silicon steel plates, whereby the amount of the eddy current flowing in the axial conductor portions 42a can be further increased by employing the alloy containing Cu which is the nonmagnetic material and the Fe alloy containing Si which is the ferromagnetic material having high magnetic permeability. Cu has lower electric resistance than Al which is also the nonmagnetic material, whereby the amount of the eddy current flowing in the axial conductor portions 42a can be further increased.

According to the first embodiment, as hereinabove described, the 44 axial conductor portions 42a are inclined with respect to the axis 300 of rotation extending in the direction X at the angle θ3, whereby the eddy current generated in the 44 axial conductor portions 42a can be substantially uniformized as compared with a case where the axial conductor portions 42a extend parallelly to the extensional direction of the axis 300 of rotation. Thus, the torque and the Joule heat generated in the 44 axial conductor portions 42a can also be substantially uniformized, whereby the torque and the amount of the Joule heat can be inhibited from local increase in the conductor portion 42.

According to the first embodiment, as hereinabove described, the 44 axial conductor portions 42a are formed to be inclined with respect to the axis 300 of rotation extending in the direction X at the angle θ3, whereby the 44 axial conductor portions 42a extending in the state inclined with respect to the axis 300 of rotation at the angle θ3 can be easily formed by simply arranging the 44 axial conductor portions 42a in the 44 groove portions 41c extending in the state inclined with respect to the axis 300 of rotation at the angle θ3 when the 44 axial conductor portions 42a are also formed to be inclined with respect to the axis 300 of rotation extending in the direction X at the angle θ3.

EXAMPLES

Confirmatory experiments of relative rotational frequency-torque measurement, torque-Joule loss measurement and relative rotational frequency-Joule loss measurement conducted in order to confirm effects of the coupling device 1 according to the aforementioned first embodiment are now described with reference to FIGS. 1, 2 and 8 to 15.

In the relative rotational frequency-torque measurement, the torque-Joule loss measurement and the relative rotational frequency-Joule loss measurement described below, a coupling device identical to the coupling device 1 according to the aforementioned first embodiment was employed as Example 1. More specifically, a coupling device 1 provided with a yoke-side portion 20 having a yoke-side member 40 including a yoke 41 having projecting portions 41d arranged between 44 axial conductor portions 42a as shown in FIG. 2 was employed as Example 1. In this case, a conductor portion 42 was prepared from a material made of an alloy containing Al, which is a nonmagnetic material.

Figure 8:
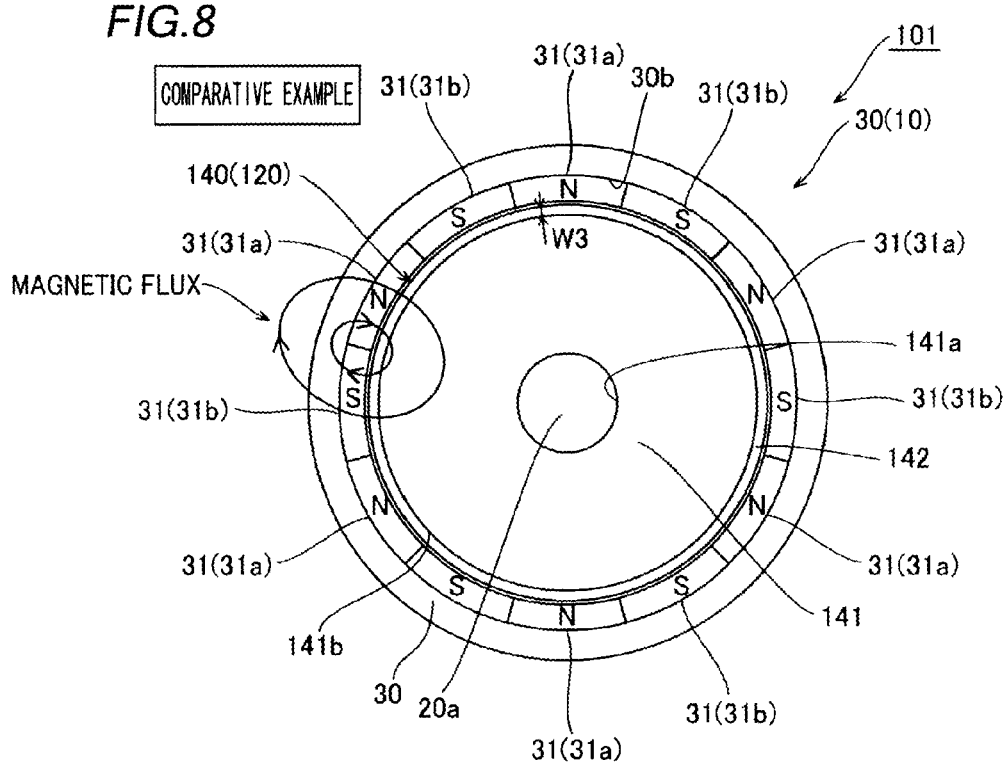
FIG. 8 is a plan view showing a coupling device according to comparative example.

On the other hand, a coupling device 101 shown in FIG. 8 was employed as comparative example 1 for Example 1. The coupling device 101 according to comparative example 1 was so formed that a yoke-side member 140 of a yoke-side portion 120 had a conductor portion 142 arranged to cover an outer peripheral surface 141b of a cylindrical yoke 141. In other words, the coupling device 101 according to comparative example 1 was formed to have only the conductor portion 142 without projecting portions, dissimilarly to the coupling device 1 according to Example 1 in which the axial conductor portions 42a and the projecting portions 41d of the yoke 41 were alternately arranged. The conductor portion 142, having a substantially uniform radial thickness W3 of 2 mm, was prepared from a material made of Cu, which is a nonmagnetic material. The conductor portion 142, made of Cu, of the coupling device 101 according to comparative example 1 had lower electric resistance than the conductor portion 42, made of the alloy containing Al, of the coupling device 1 according to Example 1. Thus, the amount of eddy current flowing in the conductor portion 142 of the coupling device 101 according to comparative example 1 was larger than that of eddy current flowing in the conductor portion 42 of the coupling device 1 according to Example 1 under the same conditions. The remaining structure of the coupling device 101 according to comparative example 1 was similar to that of the coupling device 1 according to Example 1. FIG. 8 shows only magnetic poles on the side of an axis 300 (see FIG. 1) of rotation. The coupling device 101 was so formed that magnetic flux flows between magnets 31a and magnets 31b adjacent thereto.

As dimensions common to the coupling devices 1 and 101 according to Example 1 and comparative example 1, the inner diameter L1 (see FIG. 1) of a concave inner peripheral surface 30b of a magnet-side rotator 30 was set to 90 mm and the outer diameter L2 (see FIG. 1) of the magnet-side rotator 30 was set to 102 mm in each of the coupling devices 1 and 101. Further, the radial thickness W1 (see FIG. 1) of 12 magnets 31 was set to 5 mm in each of the coupling devices 1 and 101. In addition, the interval (clearance) between the yoke-side member 40 (140) and the magnet-side rotator 30 was set to 1 mm in each of the coupling devices 1 and 101. Further, the length L4 (see FIG. 1) of the yoke 41 (141) in a direction X was set to 60 mm in each of the coupling devices 1 and 101.

The yoke 41 of the coupling device 1 according to Example 1 was provided in the form of a cylinder having a diameter L3 (see FIG. 1) of 78 mm, while the yoke 141 of the coupling device 101 according to comparative example 1 was provided in the form of a cylinder having a diameter of 74 mm. Further, the radial depth of 44 groove portions 41c in the coupling device 1 according to Example 1 was set to 9.0 mm, and the radial thickness W2 of the conductor portion 42 was set to 9.0 mm. In addition, the radial thickness L5 (see FIG. 1) of a pair of short-circuit portions 42b was set to 10 mm.

Figure 9:
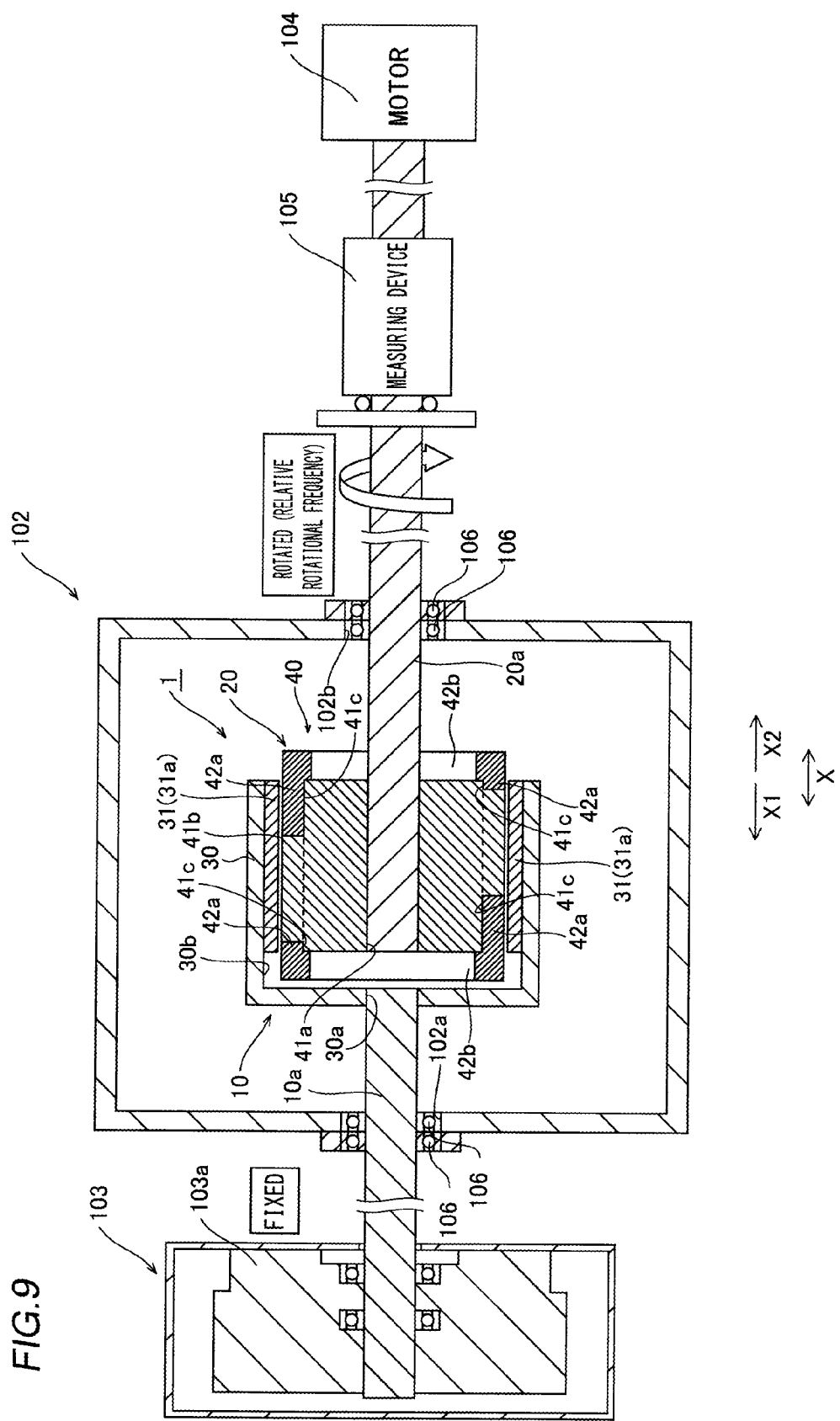
FIG. 9 is a schematic diagram showing a measuring system employed for confirmatory experiments conducted in order to confirm effects of the coupling device according to the first embodiment of the present invention.

A measuring system shown in FIG. 9 was employed for the confirmatory experiments of the relative rotational frequency-torque measurement, the torque-Joule loss measurement and the relative rotational frequency-Joule loss measurement. In this measuring system, a magnet-side portion 10 was connected to a load portion, while the yoke-side portion 20 was connected to a motor. More specifically, the measuring system was constituted of the coupling device 1 according to first embodiment, a housing 102 containing the coupling device 1 therein, a powder brake 103 as the load portion connected to a first end portion (along arrow X1) of a shaft portion 10a, a motor 104 connected to a first end portion (along arrow X2) of a shaft portion 20a and a measuring device 105 arranged on the shaft portion 20a between the yoke-side member 40 and the motor 104. In Example 1, the measuring system was constituted by connecting the magnet-side portion 10 and the yoke-side portion 20 to the sides of the load portion (powder brake 103) and the motor 104 respectively, dissimilarly to the aforementioned first embodiment.

The measuring system is now described in more detail. The housing 102 had a cylindrical shape, and received the coupling device 1 therein. Hole portions 102a and 102b were formed on side portions of the housing 102 along arrows X1 and X2 respectively, in order to receive the shaft portions 10a and 20a in the direction X respectively. Bearings 106 were arranged in both of the hole portions 102a and 102b. Other bearings 106 were also arranged on the outer sides (along arrow X1) of the hole portions 102a and 102b.

The powder brake 103 connected to the first end portion (along arrow X1) of the shaft portion 10a included a rotor 103a arranged therein, a magnetic pulverulent body (not shown) arranged between the rotor 103a and the shaft portion 10a and an exciting coil (not shown). The powder brake 103 was so formed that the magnetic pulverulent body arranged between the rotor 103a and the shaft portion 10a connected the rotor 103a and the shaft portion 10a with each other when current was fed to the exciting coil to generate a magnetic field, to transmit rotation of the shaft portion 10a to the rotor 103a. Further, the powder brake 103 was so formed that generated braking force was increased in response to the magnitude of the current fed to the exciting coil. The powder brake 103 of the measuring system shown in FIG. 9 was so formed that the current fed to the exciting coil was controlled to generate a higher torque than that generated in measurement described later. Thus, the powder brake 103 was formed to fix the shaft portion 10a in an unrotated state.

The motor 104 connected to the first end portion (along arrow X2) of the shaft portion 20a was formed to rotate the shaft portion 20a on the axis 300 (see FIG. 1) of rotation at a prescribed rotational frequency. A loss (Joule loss) resulting from Joule heat or a hysteresis loss in the yoke 41 can be listed as a cause of an energy loss in the coupling device 1. In the coupling device 1, the Joule loss is remarkably larger than other losses such as the hysteresis loss, and hence the energy loss in the coupling device 1 can be approximated to the loss resulting from the Joule heat.

The Joule loss is obtained from the difference between input energy applied from the motor 104 to the shaft portion 20a and output energy from the shaft portion 10a. The shaft portion 10a is fixed, and hence power applied to the motor 104 as the input energy can be approximated to the Joule loss.

The measuring device 105, arranged on the shaft portion 20a, was formed to be capable of measuring the rotational frequency of the shaft portion 20a on the axis 300 of rotation and a torque applied to the shaft portion 20a. The shaft portion 10a was fixed, and hence the measuring system was so formed that the rotational frequency of the shaft portion 20a measured in the measuring device 105 corresponded to the rotational frequency difference (relative rotational frequency) between the rotational frequencies of the magnet-side rotator 30 and the yoke-side member 40.

The confirmatory experiments for comparative example 1 were conducted through a measuring system having a structure similar to the above except that the coupling device 1 shown in FIG. 9 was replaced with the coupling device 101 shown in FIG. 8.

(Relative Rotational Frequency-Torque Measurement)

The relative rotational frequency-torque measurement is now described. In this relative rotational frequency-torque measurement, the magnitudes of torques in the yoke-side member 40 (140) with respect to the rotational frequency difference (relative rotational frequency) between the rotational frequencies of the magnet-side rotator 30 and the yoke-side member 40 (140) in each of the coupling devices 1 and 101 according to Example 1 and comparative example 1 were measured with the measuring device shown in FIG. 9. At this time, the torques were measured at relative rotational frequencies of 90 rpm (min$^{-1}$), 180 rpm, 450 rpm and 900 rpm respectively.

Figures 10, 11:
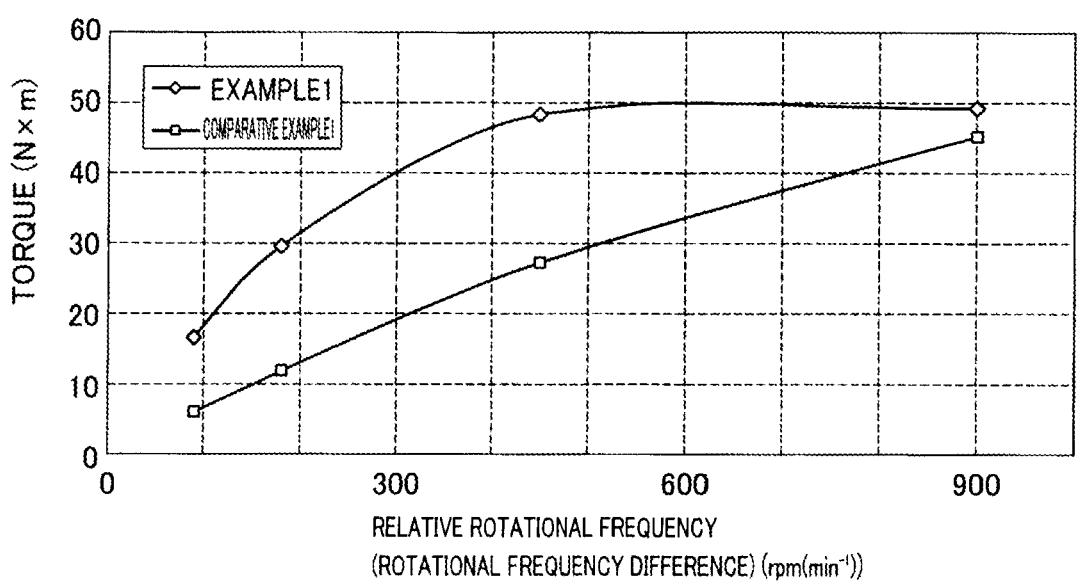
FIG. 10 is a table showing torques with respect to relative rotational frequencies in coupling devices according to Example 1 and comparative example 1 in the confirmatory experiments conducted in order to confirm the effects of the coupling device according to the first embodiment of the present invention.
FIG. 11 is a graph showing the torques with respect to the relative rotational frequencies in the coupling devices according to Example 1 and comparative example 1 in the confirmatory experiments conducted in order to confirm the effects of the coupling device according to the first embodiment of the present invention.

As the results of the relative rotational frequency-torque measurement shown in FIGS. 10 and 11, the torques in the yoke-side member 40 of the coupling device 1 according to Example 1 were higher than those in the yoke-side member 140 of the coupling device 101 according to comparative example 1 at all of the rotational frequencies of 90 rpm, 180 rpm, 450 rpm and 900 rpm.

More specifically, the yoke-side members 40 and 140 of the coupling devices 1 and 101 according to Example 1 and comparative example 1 exhibited torques of 16.5 N×m and 6.0 N×m respectively at the relative rotational frequency (rotational frequency difference) of 90 rpm. At the relative rotational frequency of 180 rpm, the yoke-side members 40 and 140 of the coupling devices 1 and 101 according to Example 1 and comparative example 1 exhibited torques of 29.6×m and 11.8 N×m respectively. At the relative rotational frequency of 450 rpm, the yoke-side members 40 and 140 of the coupling devices 1 and 101 according to Example 1 and comparative example 1 exhibited torques of 48.3×m and 27.3 N×m respectively. At the relative rotational frequency of 900 rpm, the yoke-side members 40 and 140 of the coupling devices 1 and 101 according to Example 1 and comparative example 1 exhibited torques of 49.2×m and 45.2 N×m respectively.

Thus, it has been proved that the coupling device 1 according to Example 1 exhibited a higher torque in the yoke-side member 40 per unit rotational frequency difference than the coupling device 101 according to comparative example 1. In the coupling device 1 according to Example 1, the yoke 41 was capable of more approaching the 12 magnets 31 to increase the amount of magnetic flux generated therein, and hence it was possible to increase the amount of eddy current flowing in the axial conductor portions 42a. It is conceivable that the torques in the yoke-side member 40 with respect to the relative rotational frequencies were increased as a result of this. As shown in FIG. 11, the amount of increase of the torque per unit rotational frequency difference in the coupling device 1 according to Example 1 was larger than the amount of increase of the torque per unit rotational frequency difference in the coupling device 101 according to comparative example 1 at the low relative rotational frequencies of not more than 450 rpm. Thus, the coupling device 1 according to Example 1 is conceivably a more effective structure for obtaining high torques at the low relative rotational frequencies of not more than 450 rpm.

(Torque-Joule Loss Measurement)

The torque-Joule loss measurement is now described. In this torque-Joule loss measurement, the amounts of Joule heat (Joule loss) generated with respect to torques in the yoke-side member 40 (140) in each of the coupling devices 1 and 101 according to Example 1 and comparative example 1 were measured with the measuring device shown in FIG. 9.

Figures 12, 13:
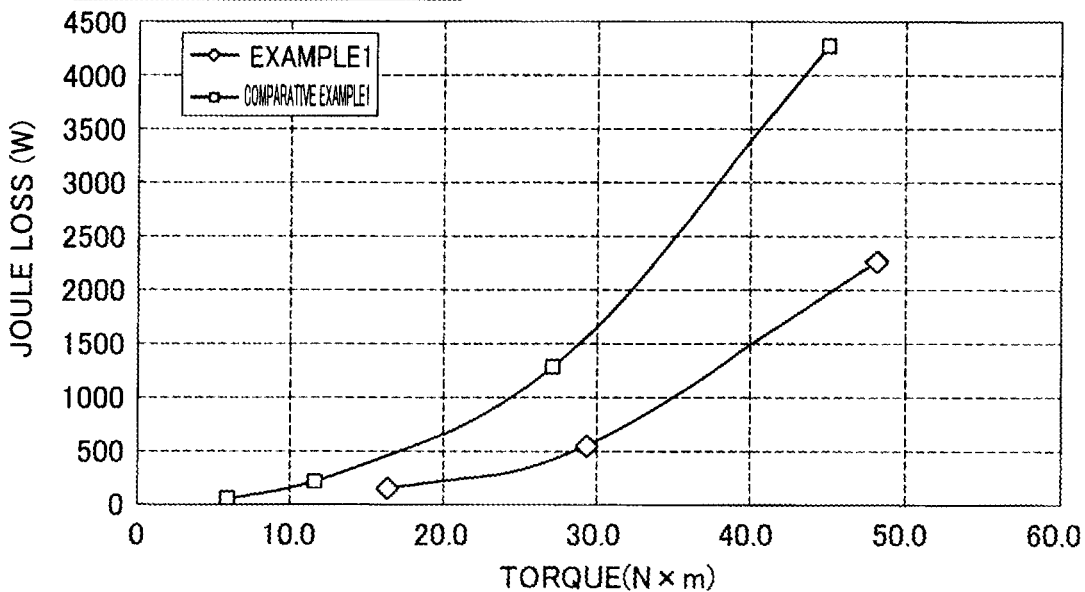
FIG. 12 is a table showing Joule losses with respect to torques in the coupling devices according to Example 1 and comparative example 1 in the confirmatory experiments conducted in order to confirm the effects of the coupling device according to the first embodiment of the present invention.
FIG. 13 is a graph showing the Joule losses with respect to the torques in the coupling devices according to Example 1 and comparative example 1 in the confirmatory experiments conducted in order to confirm the effects of the coupling device according to the first embodiment of the present invention.

As the results of the torque-Joule loss measurement shown in FIGS. 12 and 13, the coupling device 1 according to Example 1 exhibited Joule losses of 156.5 W, 558.9 W and 2273.5 W with respect to torques of 16.5 N×m, 29.6 N×m and 48.3 N×m respectively. On the other hand, the coupling device 101 according to comparative example 1 exhibited Joule losses of 56.6 W and 222.4 W with respect to torques of 6.0 N×m and 11.8 N×m respectively. Further, the coupling device 101 according to comparative example 1 exhibited Joule losses of 1287.5 W and 4269.4 W with respect to torques of 27.3 N×m and 45.2 N×m respectively.

Thus, it has been proved that the Joule losses with respect to the torques in the yoke-side member 40 were reduced in the coupling device 1 according to Example 1 as compared with the coupling device 101 according to comparative example 1, as shown in FIG. 13. Consequently, it has been proved that the amount of energy lost when obtaining a prescribed torque was smaller in the coupling device 1 according to Example 1 as compared with the coupling device 101 according to comparative example 1 and hence it was possible to efficiently convert the input energy from the magnet-side rotator 30 to a torque. This conceivably means that it was possible to more increase the amount of the eddy current flowing in the axial conductor portions 42a in the coupling device 1 according to Example 1 and hence it was not necessary to increase the relative rotational frequency (rotational frequency difference) beyond that in the coupling device 101 according to comparative example 1 in order to generate the prescribed torque but the same torque was obtainable at a smaller relative rotational frequency and hence it was possible to reduce the amount of Joule loss. In the coupling device 1 according to Example 1, further, the amount of increase of the Joule loss was more suppressed as compared with the coupling device 101 according to comparative example 1 following increase in the torque. Thus, the coupling device 1 according to Example 1 is conceivably a more effective structure for obtaining a higher torque.

(Relative Rotational Frequency-Joule Loss Measurement)

The relative rotational frequency-Joule loss measurement is now described. In this relative rotational frequency-Joule loss measurement, amounts of Joule heat (Joule loss) generated with respect to relative rotational frequencies (rotational frequency difference) in each of the coupling devices 1 and 101 according to Example 1 and comparative example 1 were measured with the measuring device shown in FIG. 9. At this time, Joule losses were measured at relative rotational frequencies of 90 rpm, 180 rpm, 450 rpm and 900 rpm respectively.

Figures 14, 15:
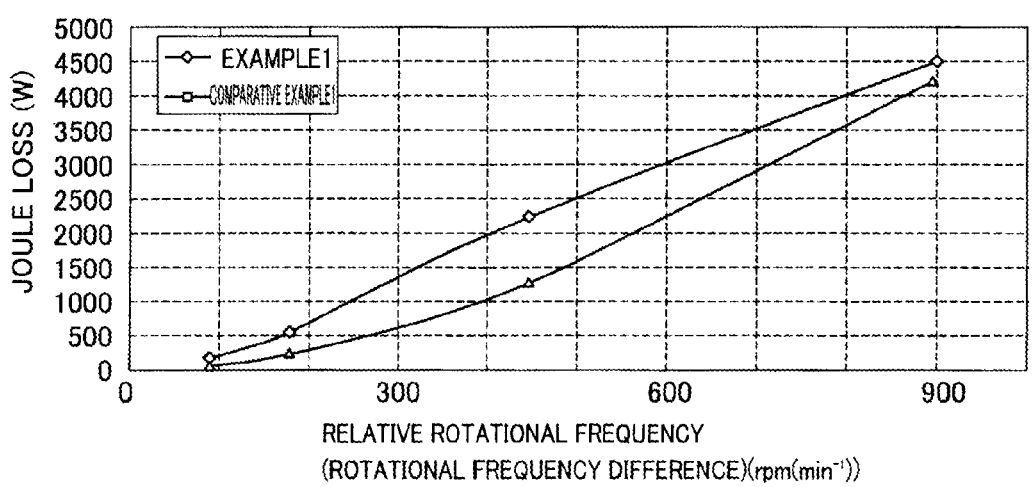
FIG. 14 is a table showing Joule losses with respect to relative rotational frequencies in the coupling devices according to Example 1 and comparative example 1 in the confirmatory experiments conducted in order to confirm the effects of the coupling device according to the first embodiment of the present invention.
FIG. 15 is a graph showing the Joule losses with respect to the relative rotational frequencies in the coupling devices according to Example 1 and comparative example 1 in the confirmatory experiments conducted in order to confirm the effects of the coupling device according to the first embodiment of the present invention.

As the results of the relative rotational frequency-Joule loss measurement shown in FIGS. 14 and 15, the Joule losses with respect to the relative rotational frequencies in the coupling device 1 according to Example 1 were higher than those in the coupling device 101 according to comparative example 1 at all of the relative rotational frequencies of 90 rpm, 180 rpm, 450 rpm and 900 rpm.

More specifically, the coupling device 1 according to Example 1 exhibited a Joule loss of 156.5 W as a whole at the relative rotational frequency (rotational frequency difference) of 90 rpm. On the other hand, the coupling device 101 according to comparative example 1 exhibited a Joule loss of 56.6 W as a whole at the relative rotational frequency of 90 rpm. Further, the coupling device 1 according to Example 1 exhibited a Joule loss of 558.9 W as a whole at the relative rotational frequency of 180 rpm. On the other hand, the coupling device 101 according to comparative example 1 exhibited a Joule loss of 222.4 W as a whole at the relative rotational frequency of 180 rpm.

In addition, the coupling device 1 according to Example 1 exhibited a Joule loss of 2273.5 W as a whole at the relative rotational frequency of 450 rpm. On the other hand, the coupling device 101 according to comparative example 1 exhibited a Joule loss of 1287.5 W as a whole at the relative rotational frequency of 450 rpm. Further, the coupling device 1 according to Example 1 exhibited a Joule loss of 4535.7 W as a whole at the relative rotational frequency of 900 rpm. On the other hand, the coupling device 101 according to comparative example 1 exhibited a Joule loss of 4269.4 W as a whole at the relative rotational frequency of 900 rpm.

Thus, it has been proved that the Joule losses with respect to the relative rotational frequencies (rotational frequency difference) in the coupling device 1 according to Example 1 were higher than those in the coupling device 101 according to comparative example 1. In other words, it has been proved that the coupling device 1 according to Example 1, capable of increasing the Joule loss, was capable of generating higher braking force than the coupling device 101 according to comparative example 1. This conceivably means that the coupling device 1 according to Example 1, capable of more easily increasing the amount of eddy current flowing in the axial conductor portions 42a, was capable of easily obtaining braking force following increase in the amount of the eddy current.

From the aforementioned results of the relative rotational frequency-torque measurement, the torque-Joule loss measurement and the relative rotational frequency-Joule loss measurement, it has been confirmable that the coupling device 1 according to Example 1 provided with the yoke 41 having the projecting portions 41d arranged between the 44 axial conductor portions 42a was capable of more increasing the amount of the eddy current flowing in the axial conductor portions 42a as compared with the coupling device 101 according to comparative example 1. In the case of the transmission system transmitting rotational force to the yoke-side member 40 through the eddy current, therefore, it has been confirmable that the torque in the yoke-side member 40 with respect to the rotational frequency difference (relative rotational frequency) between the rotational frequencies of the magnet-side rotator 30 and the yoke-side member 40 was more increasable and hence force was more transmittable in the coupling device 1 according to Example 1. In the case of the braking system generating braking force in the yoke-side member 40 through the eddy current, on the other hand, it has been confirmable that the amount of Joule heat with respect to the difference between the rotational frequencies of the magnet-side rotator 30 and the yoke-side member 40 was more increasable and hence the coupling device 1 according to Example 1 was capable of generating higher braking force.

The relative rotational frequency-torque measurement at various ratios between the circumferential lengths of the axial conductor portions 42a and the yoke 41 and between the radial thicknesses of the axial conductor portions 42a and the magnets 31 in the coupling device 1 according to the aforementioned first embodiment is now described with reference to FIGS. 1, 2, 8, 9 and 16 to 19.

In the relative rotational frequency-torque measurement at various ratios between the circumferential lengths of the axial conductor portions 42a and the yoke 41 and between the radial thicknesses of the axial conductor portions 42a and the magnets 31 described below, coupling devices similar in structure to and different in size from the coupling device 1 (see FIGS. 1 and 2) according to the aforementioned first embodiment were employed as Examples 2 to 9. Further, a coupling device similar in structure to and different in size from the coupling device 101 (see FIG. 8) according to comparative example 1 was employed as comparative example 2. More specifically, the inner diameter L1 of a concave inner peripheral surface of a motor-side rotator and the outer diameter L2 of the motor-side rotator were set to 73 mm and 83 mm respectively in each of the coupling devices according to Examples 2 to 9 and comparative example 2, as shown in FIG. 1. Further, the interval (clearance) between a yoke-side member and the motor-side rotator was set to 1 mm in each of the coupling devices according to Examples 2 to 9 and comparative example 2. In addition, the diameter L3 of a yoke and the length L4 thereof in a direction X were set to 63 mm and 30 mm respectively in each of the coupling devices according to Examples 2 to 9 and comparative example 2. In each of the coupling devices according to Examples 2 to 9, the radial depth of groove portions and the radial thicknesses W2 and L5 of axial conductor portions and short-circuit portions were set to 6.8 mm, 6.3 mm and 8 mm respectively.

Figures 16, 17:
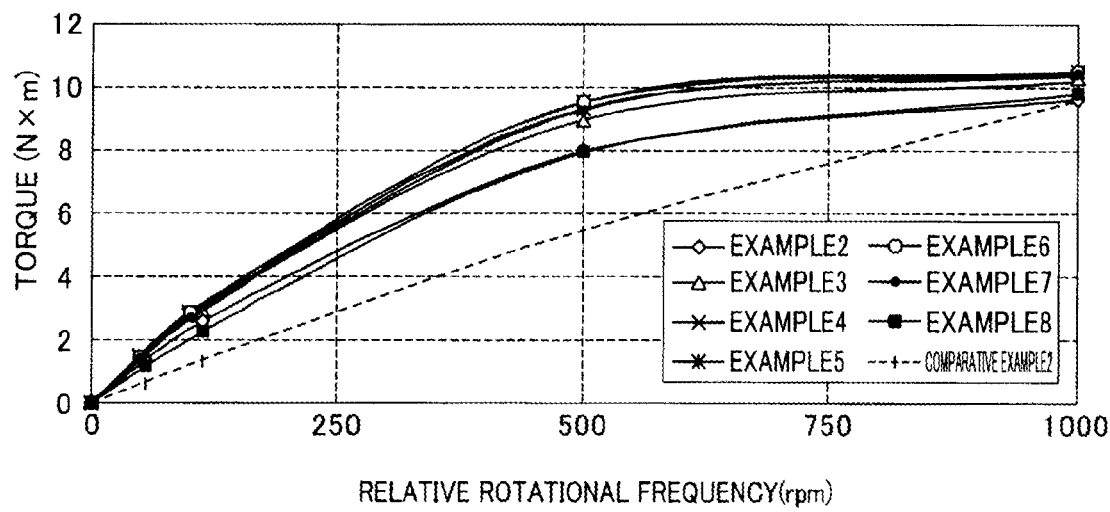
FIG. 16 is a table showing torques with respect to relative rotational frequencies in coupling devices according to Examples 2 to 8 and comparative example 2 in the confirmatory experiments conducted in order to confirm the effects of the coupling device according to the first embodiment of the present invention.
FIG. 17 is a graph showing the torques with respect to the relative rotational frequencies in the coupling devices according to Examples 2 to 8 and comparative example 2 in the confirmatory experiments conducted in order to confirm the effects of the coupling device according to the first embodiment of the present invention.

The coupling devices according to Examples 2 to 8 were so formed that the ratios between the circumferential lengths of the axial conductor portions and the yokes were at different values. More specifically, the ratio between the circumferential lengths of the axial conductor portions and projecting portions of the yoke was set to 1:1.4 in the coupling device according to Example 2, as shown in FIG. 16. In the coupling device according to Example 3, the ratio between the circumferential lengths of the axial conductor portions and the projecting portions of the yoke was set to 1:1. In the coupling device according to Example 4, the ratio between the circumferential lengths of the axial conductor portions and the projecting portions of the yoke was set to 1.2:1. The ratio (1.2:1) between the circumferential lengths of the axial conductor portions and the projecting portions of the yoke in the coupling device according to Example 4 was identical to that in the coupling device 1 according to the aforementioned first embodiment.

In the coupling device according to Example 5, the ratio between the circumferential lengths of the axial conductor portions and the projecting portions of the yoke was set to 1.4:1. In the coupling device according to Example 6, the ratio between the circumferential lengths of the axial conductor portions and the projecting portions of the yoke was set to 1.8:1. In the coupling device according to Example 7, the ratio between the circumferential lengths of the axial conductor portions and the projecting portions of the yoke was set to 2.1:1. In the coupling device according to Example 8, the ratio between the circumferential lengths of the axial conductor portions and the projecting portions of the yoke was set to 3.4:1.

The coupling devices according to Examples 4 and 9 were so formed that the ratios between the radial thicknesses of the axial conductor portions and the magnets were at different values. More specifically, the ratio between the radial thicknesses of the axial conductor portions and the magnets was set to 1.7:1 in the coupling device according to Example 4. The ratio (1.7:1) between the radial thicknesses of the axial conductor portions and the magnets in the coupling device according to Example 4 was approximate to the ratio (1.8:1) between the radial thicknesses W2 and W1 of the axial conductor portions 42a and the magnets 31 in the coupling device 1 according to the aforementioned first embodiment. In the coupling device according to Example 9, the ratio between the circumferential lengths of the axial conductor portions and the projecting portions of the yoke was set to 1:1.

In the relative rotational frequency-torque measurement, the magnitudes of torques in the yoke-side member with respect to the rotational frequency difference (relative rotational frequency) between the rotational frequencies of the motor-side rotator and the yoke-side member in each of the coupling devices according to Examples 2 to 9 were measured with the measuring system shown in FIG. 9. At this time, torques were measured at relative rotational frequencies of 0 rpm, 50 rpm, 100 rpm, 500 rpm and 1000 rpm respectively.

As the results of the relative rotational frequency-torque measurement of the coupling devices according to Examples 2 to 8 and comparative example 2 shown in FIGS. 16 and 17, the coupling devices according to Examples 2 to 8 exhibited higher torques than the coupling device according to comparative example 2 at all of the relative rotational frequencies (rotational frequency difference) of 50 rpm, 100 rpm, 500 rpm and 1000 rpm.

More specifically, all of the coupling devices according to Examples 2 to 8 and comparative example 2 exhibited torques of 0 N×m at the relative rotational frequency (rotational frequency difference) of 0 rpm. At the relative rotational frequency of 50 rpm, the coupling devices according to Examples 2, 3, 4, 5, 6, 7 and 8 and comparative example 2 exhibited torques of 1.24 N×m, 1.44 N×m, 1.50 N×m, 1.50 N×m, 1.45 N×m, 1.36 N×m, 1.06 N×m and 0.62 N×m respectively. At the relative rotational frequency of 100 rpm, the coupling devices according to Examples 2, 3, 4, 5, 6, 7 and 8 and comparative example 2 exhibited torques of 2.36 N×m, 2.76 N×m, 2.88 N×m, 2.90 N×m, 2.83 N×m, 2.65 N×m, 2.04 N×m and 1.22 N×m respectively.

At the relative rotational frequency of 500 rpm, the coupling devices according to Examples 2, 3, 4, 5, 6, 7 and 8 and comparative example 2 exhibited torques of 7.91 N×m, 8.93 N×m, 9.27 N×m, 9.47 N×m, 9.49 N×m, 9.26 N×m, 7.90 N×m and 5.45 N×m respectively. At the relative rotational frequency of 1000 rpm, the coupling devices according to Examples 2, 3, 4, 5, 6, 7 and 8 and comparative example 2 exhibited torques of 9.58 N×m, 10.17 N×m, 10.35 N×m, 10.41 N×m, 10.45 N×m, 10.41 N×m, 9.76 N×m and 9.55 N×m respectively.

Thus, it has been proved that the torques in the yoke-side member with respect to the relative rotational frequencies (rotational frequency difference) in each of the coupling devices according to Examples 2 to 8 were higher than those in the coupling device according to comparative example 2. It has also been proved that the torques in the yoke-side member with respect to the relative rotational frequencies (rotational frequency difference) in each of the coupling devices according to Examples 3 to 6 were higher than those in each of the coupling devices according to Examples 2, 7 and 8. It is conceivable that electric resistance of the axial conductor portions was increased due to reduction of circumferential sectional areas thereof to reduce the amount of eddy current flowing in the axial conductor portions in the coupling device according to Example 2 having the ratio of 1:1.4 between the circumferential lengths of the axial conductor portions and the projecting portions of the yoke and hence the coupling device according to Example 2 exhibited lower torques than the coupling devices according to Examples 3 to 6 having the ratios of 1:1 to 1.8:1 between the circumferential lengths of the axial conductor portions and the projecting portions of the yokes. It is also conceivable that the amount of the eddy current flowing in the axial conductor portions was reduced due to saturation of magnetic flux, generated from the magnets opposed to the axial conductor portions, on the projecting portions of the yoke in each of the coupling devices according to Examples 7 and 8 having the ratios of 2.1:1 and 3.4:1 between the circumferential lengths of the axial conductor portions and the projecting portions of the yokes respectively and hence the coupling devices according to Examples 7 and 8 exhibited lower torques than the coupling devices according to Examples 3 to 6 having the ratios of 1:1 to 1.8:1 between the circumferential lengths of the axial conductor portions and the projecting portions of the yokes.

Figures 18, 19:
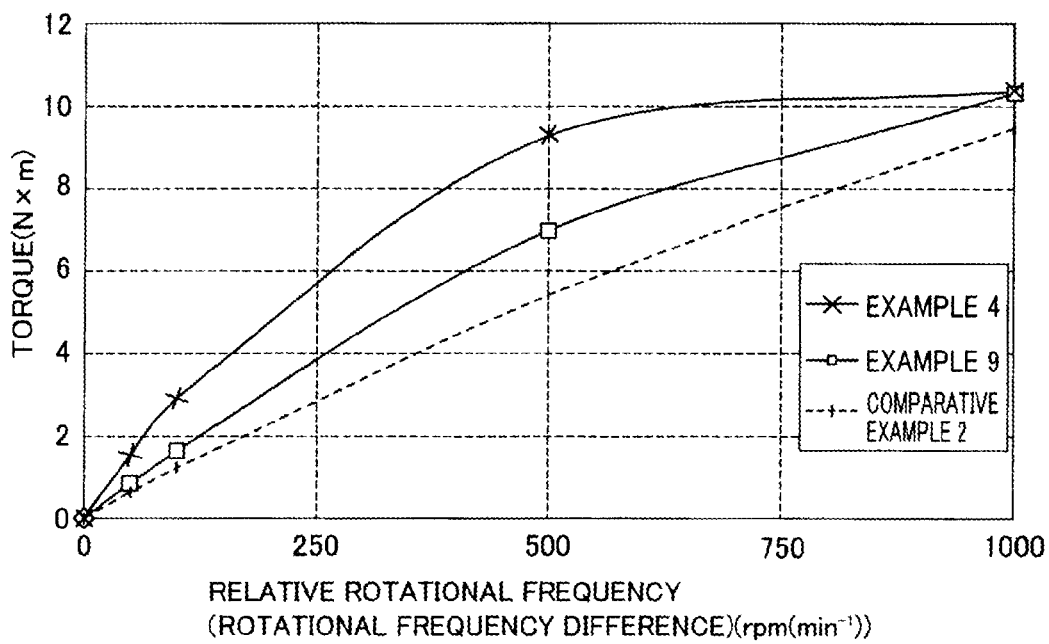
FIG. 18 is a table showing torques with respect to relative rotational frequencies in coupling devices according to Examples 4 and 9 and comparative example 2 in the confirmatory experiments conducted in order to confirm the effects of the coupling device according to the first embodiment of the present invention.
FIG. 19 is a graph showing the torques with respect to the relative rotational frequencies in the coupling devices according to Examples 4 and 9 and comparative example 2 in the confirmatory experiments conducted in order to confirm the effects of the coupling device according to the first embodiment of the present invention.

As the results of the measurement related to the coupling devices according to Examples 4 and 9 and comparative example 2 shown in FIGS. 18 and 19, the coupling devices according to Examples 4 and 9 exhibited higher torques than the coupling device according to comparative example 2 at all of the relative rotational frequencies (rotational frequency difference) of 50 rpm, 100 rpm, 500 rpm and 1000 rpm.

More specifically, the coupling devices according to Examples 4 and 9 and comparative example 2 exhibited torques of 0 N×m at the relative rotational frequency (rotational frequency difference) of 0 rpm. At the relative rotational frequency of 50 rpm, the coupling devices according to Examples 4 and 9 and comparative example 2 exhibited torques of 1.50 N×m, 0.81 N×m and 0.62 N×m respectively, as described above. At the relative rotational frequency of 100 rpm, the coupling devices according to Examples 4 and 9 and comparative example 2 exhibited torques of 2.88 N×m, 1.60 N×m and 1.22 N×m respectively, as described above. At the relative rotational frequency of 500 rpm, the coupling devices according to Examples 4 and 9 and comparative example 2 exhibited torques of 9.27 N×m, 6.94 N×m and 5.45 N×m respectively, as described above. At the relative rotational frequency of 1000 rpm, the coupling devices according to Examples 4 and 9 and comparative example 2 exhibited torques of 10.35 N×m, 10.26 N×m and 9.55 N×m respectively, as described above.

Thus, it has been proved that the torques in the yoke-side member with respect to the relative rotational frequencies (rotational frequency difference) in each of the coupling devices according to Examples 4 and 9 were higher than those in the coupling device according to comparative example 2. It has also been proved that the torques in the yoke-side member with respect to the relative rotational frequencies (rotational frequency difference) in the coupling device according to Example 4 were higher than those in the coupling device according to Example 9. It is conceivable that the electric resistance of the axial conductor portions was increased due to reduction of circumferential sectional areas thereof to reduce the amount of eddy current flowing in the axial conductor portions in the coupling device according to Example 9 having the ratio of 1:1 between the circumferential lengths of the axial conductor portions and the projecting portions of the yoke and hence the coupling device according to Example 9 exhibited lower torques than the coupling device according to Example 4 having the ratio of 1.7:1 between the circumferential lengths of the axial conductor portions and the projecting portions of the yoke.

Confirmatory experiments of relative rotational frequency-torque measurement, torque-Joule loss measurement and relative rotational frequency-Joule loss measurement with reference to various compositions of the alloy employed as the material for the conductor portion 42 of the yoke-side member 40 of the coupling device 1 according to the aforementioned first embodiment are now described with reference to FIGS. 2, 8, 9 and 20 to 25.

In the relative rotational frequency-torque measurement, the torque-Joule loss measurement and the relative rotational frequency-Joule loss measurement described below, coupling devices according to Examples 10 and 11 were prepared identically to the coupling device 1 according to the aforementioned first embodiment. More specifically, a conductor portion 42 was prepared from a material made of an alloy containing Al, which is a nonmagnetic material, in the coupling device according to Example 10. In the coupling device according to Example 11, a conductor portion 42 was prepared from a material made of an alloy containing Cu, which is also a nonmagnetic material. The remaining structures of the coupling devices according to Examples 10 and 11 were similar to that of the coupling device 1 according to Example 1 shown in FIG. 2. In other words, the coupling device according to Example 10 was similar in structure to the coupling device 1 according to Example 1.

On the other hand, a coupling device 101 according to comparative example 3 for Example 10 was formed similarly to the coupling device 101 according to comparative example 1 shown in FIG. 8, except that a conductor portion 142 thereof was prepared from a material made of an alloy containing Al, which is a nonmagnetic material. Further, a coupling device 101 according to comparative example 4 for Example 11 was formed similarly to the coupling device 101 according to comparative example 1 shown in FIG. 8, except that a conductor portion 142 thereof was prepared from a material made of an alloy containing Cu, which is also a nonmagnetic material. In other words, the coupling device 101 according to comparative example 4 was similar in structure to the coupling device 101 according to comparative example 1.

(Relative Rotational Frequency-Torque Measurement)

In this relative rotational frequency-torque measurement, the magnitudes of torques in a yoke-side member 40 (140) with respect to rotational frequency difference (relative rotational frequency) between rotational frequencies of a magnet-side rotator 30 and a yoke-side member 40 (140) in each of the coupling devices according to Examples 10 and 11 and the coupling devices 101 according to comparative examples 3 and 4 were measured with the measuring device shown in FIG. 9. At this time, torques were measured at relative rotational frequencies of 90 rpm (min$^{-1}$), 180 rpm, 450 rpm and 900 rpm respectively.

Figures 20, 21:
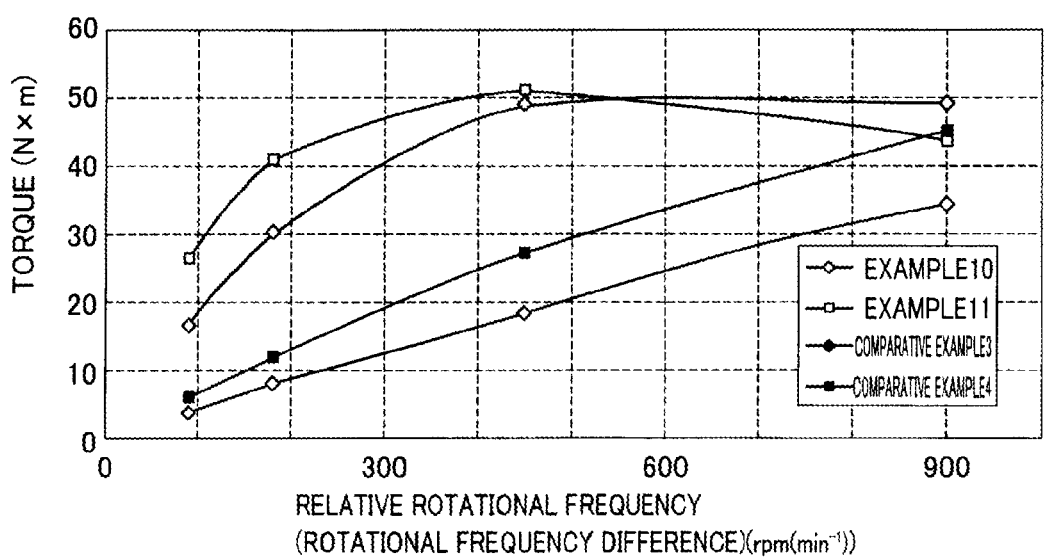
FIG. 20 is a table showing torques with respect to relative rotational frequencies in coupling devices according to Examples 10 and 11 and comparative examples 3 and 4 in the confirmatory experiments conducted in order to confirm the effects of the coupling device according to the first embodiment of the present invention.
FIG. 21 is a graph showing the torques with respect to the relative rotational frequencies in the coupling devices according to Examples 10 and 11 and comparative examples 3 and 4 in the confirmatory experiments conducted in order to confirm the effects of the coupling device according to the first embodiment of the present invention.

As the results of the relative rotational frequency-torque measurement shown in FIGS. 20 and 21, the coupling device according to Example 10 and the coupling device 101 according to comparative example 3 employing the materials made of the alloys containing Al for the conductor portions 42 and 142 exhibited torques of 17.9 N×m and 4.3 N×m respectively at the relative rotational frequency (rotational frequency difference) of 90 rpm. At the relative rotational frequency of 180 rpm, the coupling device according to Example 10 and the coupling device 101 according to comparative example 3 exhibited torques of 31.4 N×m and 8.0 N×m respectively. At the relative rotational frequency of 900 rpm, the coupling device according to Example 10 and the coupling device 101 according to comparative example 3 exhibited torques of 49.2 N×m and 33.8 N×m respectively.

On the other hand, the coupling device 1 according to Example 11 and the coupling device 101 according to comparative example 4 employing the materials made of the alloys containing Cu for the conductor portions 42 and 142 exhibited torques of 26.0 N×m and 6.5 N×m respectively at the relative rotational frequency (rotational frequency difference) of 90 rpm. At the relative rotational frequency of 180 rpm, the coupling device according to Example 11 and the coupling device 101 according to comparative example 4 exhibited torques of 41.5 N×m and 12.1 N×m respectively. At the relative rotational frequency of 450 rpm, the coupling device according to Example 11 and the coupling device 101 according to comparative example 4 exhibited torques of 51.1 N×m and 27.8 N×m respectively. At the relative rotational frequency of 900 rpm, the coupling device according to Example 11 and the coupling device 101 according to comparative example 4 exhibited torques of 44.4 N×m and 46.0 N×m respectively.

Thus, it has been proved that the torques in the yoke-side member 40 with respect to the relative rotational frequencies (rotational frequency difference) in each of the coupling devices 1 according to Examples 10 and 11 were higher than those in each of the coupling devices 101 according to comparative examples 3 and 4 at the relative rotational frequencies of not more than 450 rpm. Thus, the coupling device 1 according to the first embodiment applied to Examples 10 and 11 is conceivably a more effective structure than the conventional coupling device 101 applied to comparative examples 3 and 4 for obtaining high torques at the low relative rotational frequencies of not more than 450 rpm.

It has also been proved that the coupling device according to Example 10 obtained higher torques than the coupling device 101 according to comparative example 3 in the case of employing the material made of the alloy containing Al for the conductor portion 42 (142). Consequently, it is conceivably possible to obtain a higher torque by employing the structure of the coupling device 1 according to the aforementioned first embodiment in the case of employing the material made of the alloy containing Al for the conductor portion.

(Torque-Joule Loss Measurement)

The torque-Joule loss measurement is now described. In this torque-Joule loss measurement, the amounts of Joule heat (Joule loss) generated with respect to the torques in the yoke-side member 40 (140) in each of the coupling devices 1 and 101 according to Examples 10 and 11 and comparative examples 3 and 4 were measured with the measuring device shown in FIG. 9.

Figures 22, 23:
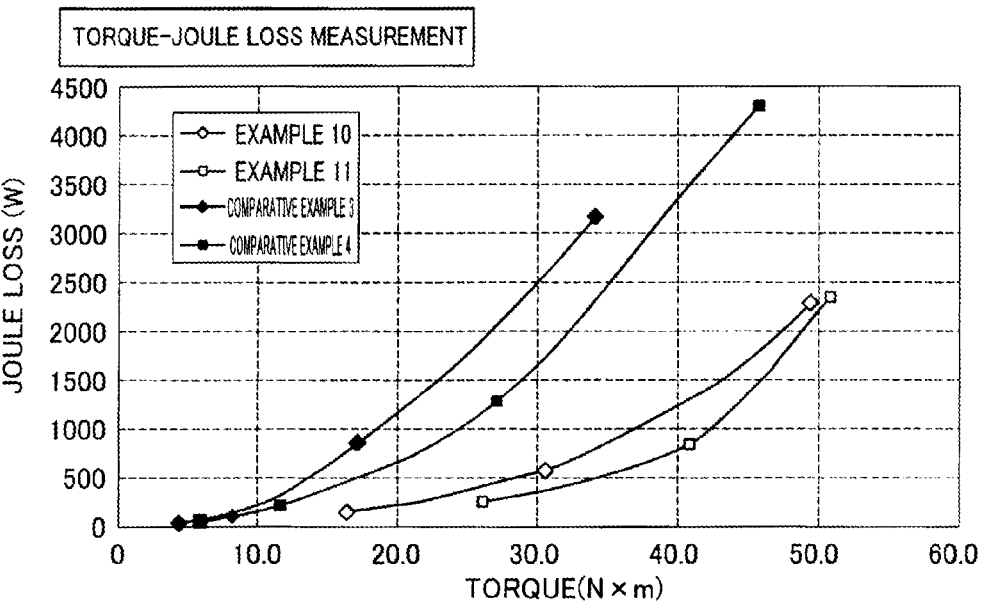
FIG. 22 is a table showing Joule losses with respect to torques in the coupling devices according to Examples 10 and 11 and comparative examples 3 and 4 in the confirmatory experiments conducted in order to confirm the effects of the coupling device according to the first embodiment of the present invention.
FIG. 23 is a graph showing the Joule losses with respect to the torques in the coupling devices according to Examples 10 and 11 and comparative examples 3 and 4 in the confirmatory experiments conducted in order to confirm the effects of the coupling device first embodiment of the present invention.

As the results of the torque-Joule loss measurement shown in FIGS. 22 and 23, the coupling device 1 according to Example 10 employing the material made of the alloy containing Al for the conductor portion 42 exhibited Joule losses of 168.9 W, 591.5 W and 2327.1 W with respect to torques of 17.9 N×m, 31.4 N×m and 49.6 N×m respectively. On the other hand, the coupling device 101 according to comparative example 3 exhibited Joule losses of 37.0 W and 145.7 W with respect to torques of 4.3 N×m and 8.0 N×m respectively. The coupling device 101 according to comparative example 3 further exhibited Joule losses of 873.5 W and 3167.3 W with respect to torques of 18.7 N×m and 33.8 N×m respectively.

The coupling device 1 according to Example 11 employing the material made of the alloy containing Cu for the conductor portion 42 exhibited Joule losses of 244.9 W, 783.6 W and 2372.0 W with respect to torques of 26.0 N×m, 41.5 N×m and 51.1 N×m respectively. On the other hand, the coupling device 101 according to comparative example 4 exhibited Joule losses of 57.6 W and 225.7 W with respect to torques of 6.5 N×m and 12.1 N×m respectively. The coupling device 101 according to comparative example 4 further exhibited Joule losses of 1306.5 W and 4329.4 W with respect to torques of 27.8 N×m and 46.0 N×m respectively.

Thus, it has been proved that the Joule losses with respect to the torques in the yoke-side member 40 were reduced in the coupling devices 1 according to Examples 10 and 11 as compared with the coupling devices 101 according to comparative examples 3 and 4. Thus, the coupling device 1 according to the first embodiment applied to Examples 10 and 11 is conceivably a more effective structure than the conventional coupling device 101 applied to comparative examples 3 and 4 for reducing an energy loss (Joule loss).

(Relative Rotational Frequency-Joule Loss Measurement)

The relative rotational frequency-Joule loss measurement is now described. In this relative rotational frequency-Joule loss measurement, the amounts of Joule heat (Joule loss) generated with respect to relative rotational frequencies (rotational frequency difference) in the whole of each of the coupling devices according to Examples 10 and 11 and the coupling devices 101 according to comparative examples 3 and 4 were measured with the measuring device shown in FIG. 9. At this time, Joule losses were measured at relative rotational frequencies of 90 rpm, 180 rpm, 450 rpm and 900 rpm respectively.

Figures 24, 25:
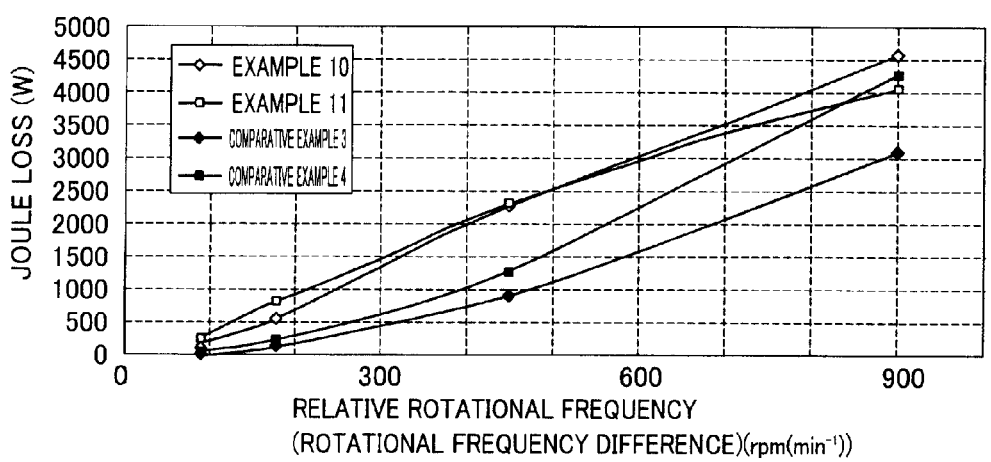
FIG. 24 is a table showing Joule losses with respect to relative rotational frequencies in the coupling devices according to Examples 10 and 11 and comparative examples 3 and 4 in the confirmatory experiments conducted in order to confirm the effects of the coupling device according to the first embodiment of the present invention.
FIG. 25 is a graph showing the Joule losses with respect to the relative rotational frequencies in the coupling devices according to Examples 10 and 11 and comparative examples 3 and 4 in the confirmatory experiments conducted in order to confirm the effects of the coupling device according to the first embodiment of the present invention.

As the results of the relative rotational frequency-Joule loss measurement shown in FIGS. 24 and 25, the coupling device 1 according to Example 10 and the coupling device 101 according to comparative example 3 employing the materials made of the alloys containing Al for the conductor portions 42 and 142 exhibited Joule losses of 168.9 W and 37.0 W respectively at the relative rotational frequency (rotational frequency difference) of 90 rpm. At the relative rotational frequency of 180 rpm, the coupling device according to Example 10 and the coupling device 101 according to comparative example 3 exhibited Joule losses of 591.5 W and 145.7 W respectively. At the relative rotational frequency of 450 rpm, the coupling device according to Example 10 and the coupling device 101 according to comparative example 3 exhibited Joule losses of 2372.1 W and 873.5 W respectively. At the relative rotational frequency of 900 rpm, the coupling device according to Example 10 and the coupling device 101 according to comparative example 3 exhibited Joule losses of 4616.5 W and 3167.3 W respectively.

On the other hand, the coupling device according to Example 11 and the coupling device 101 according to comparative example 4 employing the materials made of the alloys containing Cu for the conductor portions 42 and 142 exhibited Joule losses of 244.9 W and 57.6 W respectively at the relative rotational frequency (rotational frequency difference) of 90 rpm. At the relative rotational frequency of 180 rpm, the coupling device according to Example 11 and the coupling device 101 according to comparative example 4 exhibited Joule losses of 783.6 W and 225.7 W respectively. At the relative rotational frequency of 450 rpm, the coupling device according to Example 11 and the coupling device 101 according to comparative example 4 exhibited Joule losses of 2372.0 W and 1306.5 W respectively. At the relative rotational frequency of 900 rpm, the coupling device according to Example 11 and the coupling device 101 according to comparative example 4 exhibited Joule losses of 4144.5 W and 4329.4 W respectively.

Thus, it has been proved that the coupling devices according to Examples 10 and 11 exhibited higher Joule losses with respect to the relative rotational frequencies (rotational frequency difference) than the coupling devices 101 according to comparative examples 3 and 4 respectively at the relative rotational frequencies of not more than 450 rpm. Thus, the coupling device 1 according to the first embodiment applied to Examples 10 and 11 is conceivably a more effective structure than the conventional coupling device 101 applied to comparative examples 3 and 4 for obtaining braking force at low relative rotational frequencies of not more than 450 rpm.

It has also been proved that the coupling device according to Example 10 more easily generated braking force than the coupling device 101 according to comparative example 3 in the case of employing the material made of the alloy containing Al for the conductor portion 42. Consequently, it is conceivably possible to more easily generate braking force by employing the structure of the coupling device 1 according to the aforementioned first embodiment in the case of employing the material made of the alloy containing Al for the conductor portion.

Second Embodiment

A second embodiment of the present invention is now described with reference to FIGS. 26 to 28. In a coupling device 201 according to the second embodiment, a switch member 260 capable of relatively changing the position thereof with respect to a magnet-side rotator 30 is arranged between the magnet-side rotator 30 and a yoke-side member 40, in addition to a structure similar to that of the aforementioned first embodiment. The switch member 260 is an example of a "switching portion" in the present invention.

Figure 26:
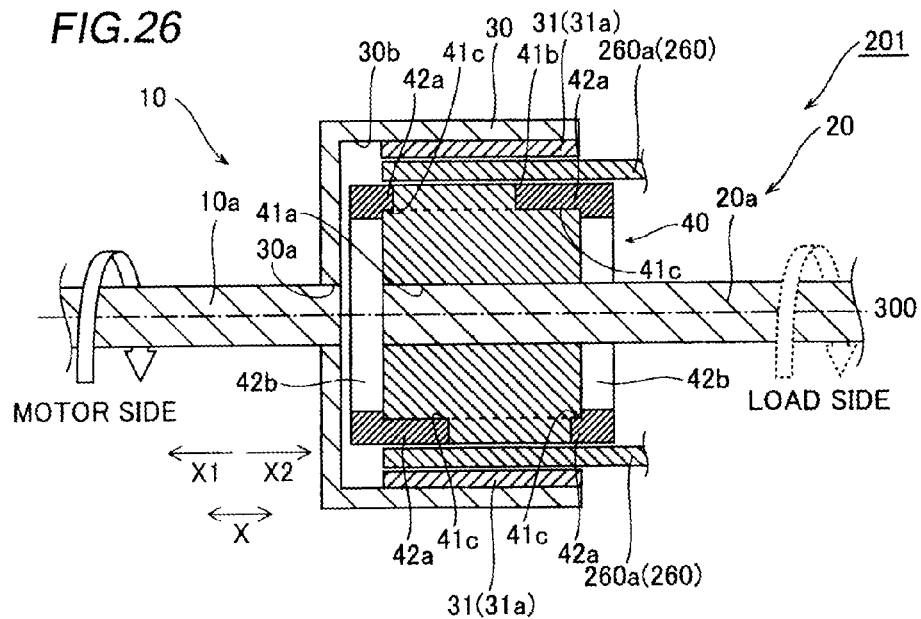
FIG. 26 is a sectional view showing a coupling device according to a second embodiment of the present invention.

In the coupling device 201 according to the second embodiment of the present invention, the switch member 260 capable of relatively changing the position thereof with respect to the magnet-side rotator 30 is arranged between the magnet-side rotator 30 and the yoke-side member 40, as shown in FIG. 26. This switch member 260 is formed to be rotatable on an axis 300 of rotation substantially identical to those of the magnet-side rotator 30 and the yoke-side member 40, and provided in the form of a cylinder extending in the extensional direction (direction X) of the axis 300 of rotation. The switch member 260 is formed to be rotatable on the axis 300 of rotation at a rotational speed substantially identical to that of the magnet-side rotator 30.

Figure 27:
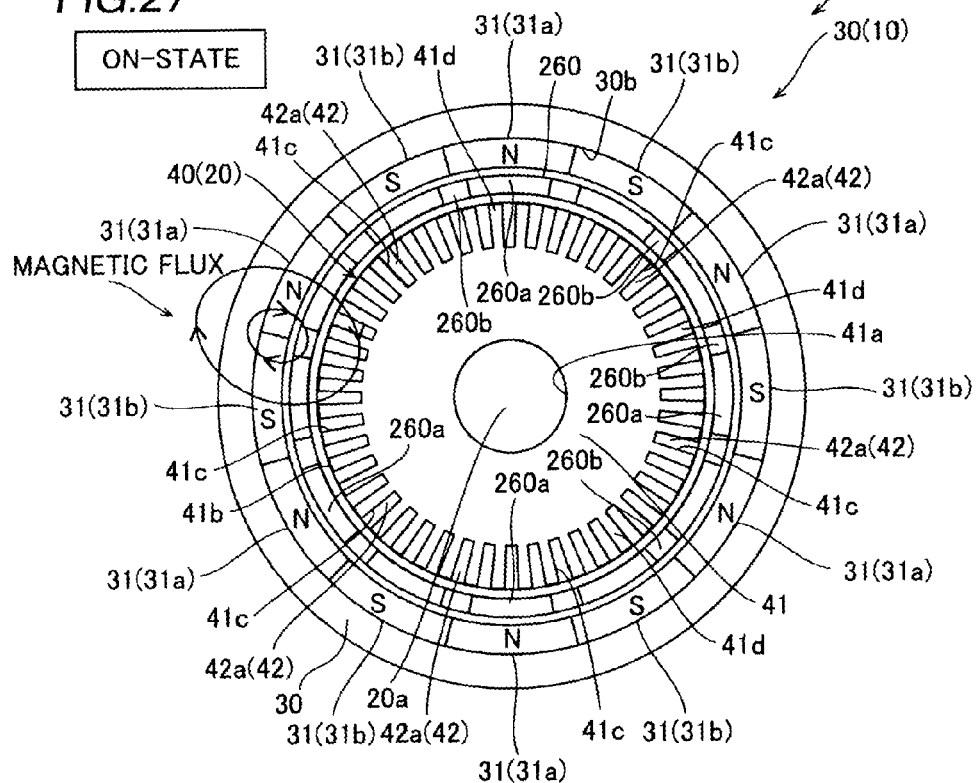
FIG. 27 is a plan view of the coupling device according to the second embodiment of the present invention as viewed along arrow X2 in FIG. 26.
Figure 28:
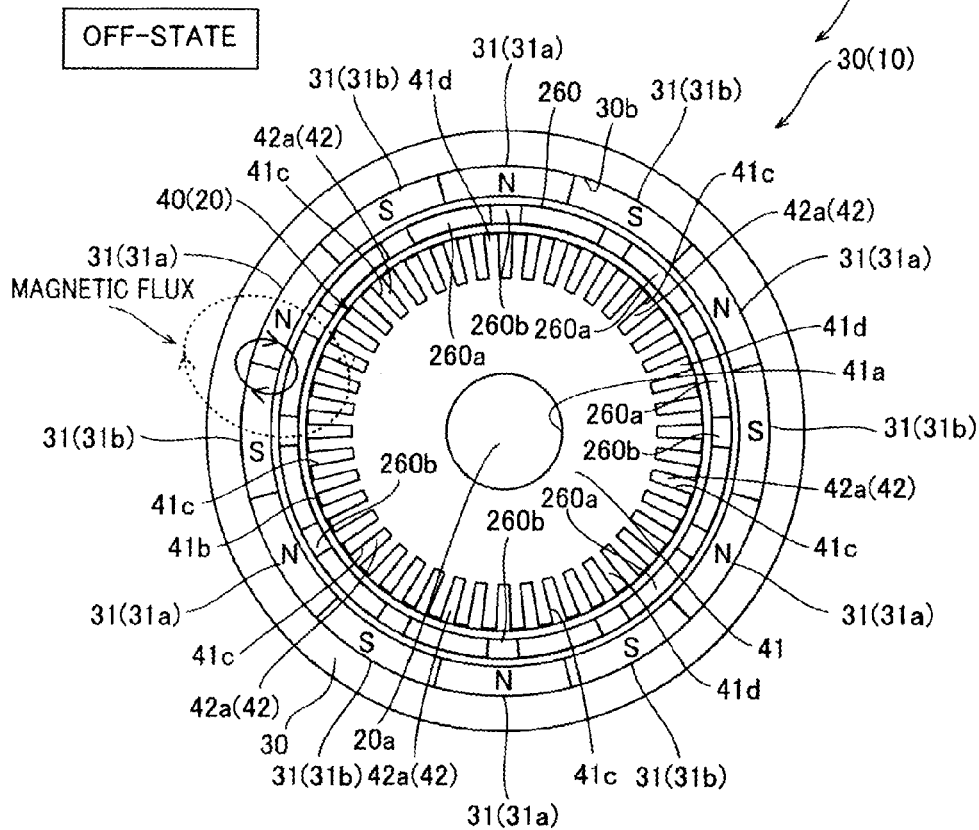
FIG. 28 is a plan view showing a state of changing a relative position of a switch member shown in FIG. 27 with respect to a motor-side rotator.

The switch member 260 is constituted of 12 transmission portions 260a, each having an outer diameter smaller than the inner diameter of each of 12 magnets 31, arranged at substantially equiangular intervals (about 30°) and 12 attenuation portions 260b arranged between the 12 transmission portions 260a at substantially equiangular intervals (about 30°), as shown in FIG. 27. Thus, the transmission portions 260a and the attenuation portions 260b are provided with the same number of (12) magnets 31, and arranged to alternately line up in the circumferential direction. The switch member 260 is so formed that the centers of the transmission portions 260a are positioned on radial straight lines connecting arbitrary magnets 31 and the axis 300 (see FIG. 26) of rotation with each other and the centers of the attenuation portions 260b are positioned on straight lines radially extending on boundaries between the arbitrary magnets 31 in the state shown in FIG. 27 (state where magnetic flux generated from the magnet-side rotator 30 is transmitted). FIG. 27 and FIG. 28 described later illustrate only magnetic poles on the side of the axis 300 of rotation, and omit illustration of a short-circuit portion 42b along arrow X2.

The transmission portions 260a of the switch member 260 are made of a ferromagnetic material such as general carbon steel such as SS400, while the attenuation portions 260b are made of an alloy mainly containing Al, which is a nonmagnetic material. Thus, the coupling device 201 is so formed that magnetic flux generated from the 12 magnets 31 and passing through the transmission portions 260a is substantially not attenuated but transmitted to a yoke 41 of the yoke-side member 40 while magnetic flux passing through the attenuation portions 260b is attenuated and hardly transmitted to the yoke 41 of the yoke-side member 40. Further, the coupling device 201 is so formed that the magnetic flux generated from the 12 magnets 31 can pass through the transmission portions 260a and hence the same is transmitted to the yoke 41 of the yoke-side member 40 (ON-state) in the state shown in FIG. 27. In other words, the coupling device 201 is formed to be capable of transmitting force to the yoke-side member 40 and generating braking force in the yoke-side member 40 by rotating the switch member 260 and the magnet-side rotator 30 at substantially identical rotational speeds in the state shown in FIG. 27.

According to the second embodiment, the coupling device 201 is formed to be capable of switching relative positions of the switch member 260 and the magnet-side rotator 30 by rotating either the magnet-side rotator 30 or the switch member 260 by about 15° on the axis 300 of rotation with a switching means (not shown). Thus, the coupling device 201 is so formed that the centers of the attenuation portions 260b are positioned on the radial straight lines connecting the arbitrary magnets 31 and the axis 300 of rotation with each other while the centers of the transmission portions 260a are positioned on the straight lines radially extending on the boundaries between the arbitrary magnets 31 when rotating either the magnet-side rotator 30 or the switch member 260 by about 15° on the axis 300 of rotation from the state shown in FIG. 27. The coupling device 201 is so formed that the magnetic flux generated from the 12 magnets 31 passes through the attenuation portions 260b as a result of this and hence the same is hardly transmitted to the yoke 41 of the yoke-side member 40 (OFF-state). In other words, the coupling device 201 is so formed that force is hardly transmitted to the yoke-side member 40 and braking force is hardly generated in the yoke-side member 40 due to the switch member 260 rotated at the rotational speed substantially identical to that of the magnet-side rotator 30 in the state shown in FIG. 28 (state where the magnetic flux generated from the magnet-side rotator 30 is hardly transmitted), even if the magnet-side rotator 30 is rotated. Consequently, the coupling device 201 is formed to be capable of adjusting transmission of force and braking force by switching the relative positions of the switch member 260 and the magnet-side rotator 30. The remaining structure of the second embodiment and a method of manufacturing the yoke-side member 40 are similar to those in the first embodiment.

According to the second embodiment, as hereinabove described, the switch member 260 capable of relatively changing the position thereof with respect to the magnet-side rotator 30 is so provided between the magnet-side rotator 30 and the yoke-side member 40 that the amount of increase in eddy current generated in the yoke-side member 40 can be switched by switching the amount of magnetic flux transmitted to the yoke-side member 40 with the switch member 260, whereby a torque and Joule heat can be more correctly controlled.

According to the second embodiment, as hereinabove described, the switch member 260 is so constituted of the transmission portions 260a made of the ferromagnetic material capable of transmitting the magnetic flux to the yoke 41 of the yoke-side member 40 in a substantially unattenuated state and the attenuation portions 260b made of the nonmagnetic material attenuating the magnetic flux that the amount of magnetic flux (magnetic flux density) passing through the attenuation portions 260b can be reduced below the amount of magnetic flux (magnetic flux density) passing through the transmission portions 260a, whereby the amount of the magnetic flux reaching the yoke-side member 40 can be easily switched by changing the relative positions of the attenuation portions 260b and the magnet-side rotator 30.

According to the second embodiment, as hereinabove described, the transmission portions 260a and the attenuation portions 260b can be alternately arranged in the circumferential direction to correspond to magnets 31a and 31b of the magnet-side rotator 30 arranged to alternately line up on a concave inner peripheral surface 30b of the magnet-side rotator 30 along the circumferential direction at substantially equiangular intervals (about 30°) when the switch member 260 is provided in the form of a cylinder extending in the extensional direction (direction X) of the axis 300 of rotation and the transmission portions 260a and the attenuation portions 260b are arranged to alternately line up in the circumferential direction, whereby the amount of the magnetic flux reaching the yoke-side member 40 can be more easily switched.

According to the second embodiment, as hereinabove described, the magnets 31 of the magnet-side rotator 30 and the transmission portions 260a and the attenuation portions 260b of the switch member 260 can be provided in one-to-one correspondence to each other by alternately arranging the 12 transmission portions 260a and the 12 attenuation portions 260b provided in the same number (12) as that of the magnets 31 of the magnet-side rotator 30 in the circumferential direction when the transmission portions 260a and the attenuation portions 260b are provided in the same number (12) as that of the magnets 31. Thus, the coupling device 201 can be so formed that the magnets 31 of the magnet-side rotator 30 and the transmission portions 260a of the switch member 260 are in one-to-one correspondence to each other in the state where the magnetic flux is transmitted while the magnets 31 of the magnet-side rotator 30 and the attenuation portions 260b of the switch member 260 are in one-to-one correspondence to each other in the state where the magnetic flux is hardly transmitted, whereby the amount of the magnetic flux reaching the yoke-side member 40 can be correctly switched.

According to the second embodiment, as hereinabove described, the transmission portions 260a are so arranged on positions opposed to the magnets 31 of the magnet-side rotator 30 in the state where the magnetic flux is transmitted that the magnetic flux from the magnet-side rotator 30 can pass through the transmission portions 260a, whereby the coupling device 201 can be so formed that the magnetic flux from the magnet-side rotator 30 is transmitted to the yoke-side member 40 when the coupling device 201 is so formed that the centers of the transmission portions 260a are positioned on the radial straight lines connecting the arbitrary magnets 31 and the axis 300 of rotation with each other and the centers of the attenuation portions 260b are positioned on the straight lines radially extending on the boundaries between the arbitrary magnets 31 in the state where the magnetic flux generated from the magnet-side rotator 30 is transmitted while the centers of the attenuation portions 260b are positioned on the radial straight lines connecting the arbitrary magnets 31 and the axis 300 of rotation with each other and the centers of the transmission portions 260a are positioned on the straight lines radially extending on the boundaries between the arbitrary magnets 31 in the state where the magnetic flux generated from the magnet-side rotator 30 is hardly transmitted. In the state where the magnetic flux is hardly transmitted, on the other hand, the attenuation portions 260b are so arranged on the positions opposed to the magnets 31 of the magnet-side rotator 30 that the magnetic flux from the magnet-side rotator 30 is inhibited from passing through the switch member 260 due to the attenuation portions 260b, whereby the magnetic flux from the magnet-side rotator 30 can be rendered hardly transmittable to the yoke-side member 40. The remaining effects of the second embodiment are similar to those of the first embodiment.

Although the present invention has been described and illustrated in detail, it is clearly understood that the same is by way of illustration and example only and is not to be taken by way of limitation, the spirit and scope of the present invention being limited only by the terms of the appended claims.

Figure 29:
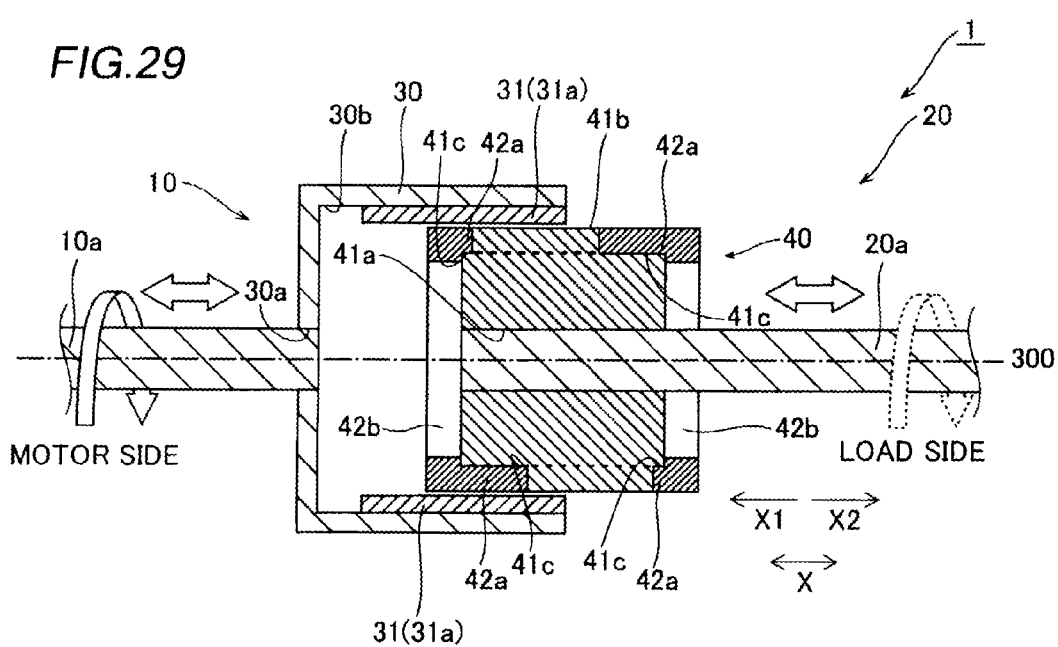
FIG. 29 is a sectional view showing a coupling device according to a modification of the first embodiment of the present invention.

For example, while the magnet-side portion 10 and the yoke-side portion 20 are unmoved in the extensional direction (direction X) of the axis 300 of rotation in each of the aforementioned first and second embodiments, the present invention is not restricted to this. According to the present invention, a magnet-side portion 10 and a yoke-side portion 20 of a coupling device 1 may alternatively be formed to be movable in an extensional direction (direction X) of an axis 300 of rotation, as in a modification of the first embodiment shown in FIG. 29. Thus, areas of portions of magnets 31 of a magnet-side rotator 30 and a yoke 41 and a conductor portion 42 of a yoke-side member 40 opposed to each other can be easily changed, whereby increase/decrease of the amount of eddy current flowing in the conductor portion 42 can be changed. Thus, a torque and Joule heat can be more correctly controlled by controlling the magnitude of the eddy current.

While the yoke-side member 40 is arranged on the inner side of the magnet-side rotator 30 provided with the 12 magnets 31 in each of the aforementioned first and second embodiments, the present invention is not restricted to this. According to the present invention, a plurality of magnets may alternatively be provided on the outer side of a motor-side rotator, and a yoke-side member may alternatively be arranged to cover the outer side of the motor-side rotator.

While the coupling device 1 and 201 is so formed that the length of the outer periphery of each axial conductor portion 42a is about 1.2 times the length of the outer periphery of each projecting portion 41d of the yoke 41 in each of the aforementioned first and second embodiments, the present invention is not restricted to this. According to the present invention, the length of the outer periphery of each axial conductor portion may not be about 1.2 times the length of the outer periphery of each projecting portion of the yoke. The ratio between the lengths of the outer peripheries of the axial conductor portions and the projecting portions of the yoke may simply be at least 1/1.4. The ratio between these lengths is preferably at least 1/1.4 and not more than 3.4/1, and more preferably at least 1/1 and not more than 2.1/1. The ratio between these lengths is further preferably at least 1.2/1 and not more than 1.8/1.

While the radial thickness W2 of each axial conductor portion 42a is about 1.8 times the radial thickness W1 of each magnet 31 in each of the aforementioned first and second embodiments, the present invention is not restricted to this. According to the present invention, the radial thickness of each axial conductor portion may not be about 1.8 times the radial thickness of each magnet. The radial thickness of each axial conductor portion is preferably in excess of the radial thickness of each magnet.

While the pair of annular short-circuit portions 42b are arranged on the end portions of the 44 axial conductor portions 42a along arrows X1 and X2 respectively in each of the aforementioned first and second embodiments, the present invention is not restricted to this. According to the present invention, the short-circuit portions may alternatively be arranged not on the end portions of the axial conductor portions but on portions other than the end portions, so far as the same can electrically connect the 44 axial conductor portions with each other.

While the conductor portion 42 is provided with the 44 axial conductor portions 42a in each of the aforementioned first and second embodiments, the present invention is not restricted to this. According to the present invention, the number of the axial conductor portions may alternatively be not more than 43 or at least 45. The number of the axial conductor portions is preferably at least 40 and not more than 50.

While the yoke 41 is formed by stacking the silicon steel plates in each of the aforementioned first and second embodiments, the present invention is not restricted to this. According to the present invention, the yoke may alternatively be made of a ferromagnetic material such as general carbon steel such as SS400, for example.

While the 44 axial conductor portions 42a are formed to be inclined at the angle θ3 with respect to the axis 300 of rotation extending in the direction X in each of the aforementioned first and second embodiments, the present invention is not restricted to this. According to the present invention, the axial conductor portions may alternatively be formed to parallelly extend along the axis of rotation.

While the outer peripheral surface 41b of the yoke 41 is cut by the prescribed amount to expose the 44 axial conductor portions 42a on the side of the outer peripheral surface 41b in each of the aforementioned first and second embodiments, the present invention is not restricted to this. According to the present invention, the axial conductor portions may alternatively be rendered unexposed on the side of the outer peripheral surface by forming the axial conductor portions in hole portions separated from the outer peripheral surface of the yoke by a prescribed distance, without cutting the outer peripheral surface of the yoke.

While no member of cooling the yoke-side portion 20 is provided in each of the aforementioned first and second embodiments, a fan may be provided in the present invention, in order to cool the yoke-side member. This fan may be integrally provided on the yoke-side member, or may be provided on the coupling device separately from the yoke-side member. Thus, heat generated in the yoke-side member can be radiated outward.

While the 44 groove portions 41c are formed on the outer peripheral surface 41b of the yoke 41 at the substantially equal angles (about 8.2°) in each of the aforementioned first and second embodiments, the present invention is not restricted to this. According to the present invention, the groove portions may not be formed at substantially equiangular intervals.

While the switch member 260 is made of the ferromagnetic material such as the general carbon steel such as SS400 and constituted of the transmission portions 260a capable of transmitting the magnetic flux and the attenuation portions 260b, made of the alloy mainly containing Al which is the nonmagnetic material, attenuating the magnetic flux in the aforementioned second embodiment, the present invention is not restricted to this. For example, the switch member may alternatively be so formed that the attenuation portions attenuating the magnetic flux consist of hole portions provided with no elements. Further alternatively, the switch member may be so formed that the attenuation portions are smaller in thickness than the transmission portions to attenuate the magnetic flux in the attenuation portions.

While the magnet-side rotator 30 (magnet rotator) connected to the motor is provided with the 12 magnets 31 and the yoke-side member 40 (yoke-side member) connected to the load portion is provided with the yoke 41 and the conductor portion 42 in each of the aforementioned first and second embodiments, the present invention is not restricted to this. According to the present invention, the magnet rotator provided with the magnets and the yoke-side member provided with the yoke and the conductor portion may alternatively be connected to the load portion and the motor respectively.

While the 12 magnets 31 are so arranged on the magnet-side rotator 30 that different magnetic poles alternately line up along the circumferential direction of the concave inner peripheral surface 30b in each of the aforementioned first and second embodiments, the present invention is not restricted to this. According to the present invention, a single magnet may alternatively be arranged on a motor-side rotator so that different magnetic poles alternately line up. Further, the number of the magnets may be not more than 11, or at least 13.

What is claimed is:
1. A coupling device comprising:
  a cylindrical magnet rotator including magnets so arranged that different magnetic poles alternately line up in a circumferential direction; and
  a cylindrical yoke-side member, including a conductor portion made of a nonmagnetic material and a yoke, arranged on the inner side or the outer side of said magnet rotator to be relatively rotatable in a state not in contact with said magnet rotator, wherein
  said conductor portion of said yoke-side member has a plurality of first conductor portions arranged to extend in a direction of the axis of rotation at a prescribed interval in said circumferential direction at least on a side opposed to said magnets,
  said yoke of said yoke-side member is at least arranged on said side opposed to said magnets in a clearance between said plurality of said first conductor portions, and the ratio between the circumferential length of each of said first conductor portions and the circumferential length of said yoke arranged in said clearance between said first conductor portions (circumferential length of each first conductor portion/circumferential length of yoke) is at least 1/1.4.

2. The coupling device according to claim 1, wherein
the ratio between the circumferential length of each of said first conductor portions and the circumferential length of said yoke arranged in said clearance between said first conductor portions is not more than 3.4/1.

3. The coupling device according to claim 2, wherein
the ratio between the circumferential length of each of said first conductor portions and the circumferential length of said yoke arranged in said clearance between said first conductor portions is at least 1/1 and not more than 2.1/1.

4. The coupling device according to claim 3, wherein
the ratio between the circumferential length of each of said first conductor portions and the circumferential length of said yoke arranged in said clearance between said first conductor portions is at least 1.2/1 and not more than 1.8/1.

5. The coupling device according to claim 1, wherein
the radial thickness of said first conductor portions is in excess of the radial thickness of said magnets.

6. The coupling device according to claim 1, wherein
said plurality of first conductor portions are formed to extend in said direction of the axis of rotation in a state arranged at substantially equal intervals in said circumferential direction.

7. The coupling device according to claim 1, wherein
said conductor portion of said yoke-side member further has an annular second conductor portion arranged on end portions of said plurality of first conductor portions in said direction of the axis of rotation for connecting said plurality of first conductor portions with each other.

8. The coupling device according to claim 7, wherein
said second conductor portions are arranged on both end portions of said first conductor portions in said direction of the axis of rotation respectively.

9. The coupling device according to claim 7, wherein
said second conductor portion is formed integrally with said plurality of first conductor portions.

10. The coupling device according to claim 1, wherein
a plurality of groove portions or a plurality of hole portions are formed in the vicinity of a surface of said yoke opposed to said magnets to extend in said direction of the axis of rotation, and each of said plurality of first conductor portions is arranged in each of said plurality of groove portions or said plurality of hole portions.

11. The coupling device according to claim 1, wherein
at least either said magnet rotator or said yoke-side member is formed to be capable of changing the areas of portions of said magnets of said magnet rotator and said yoke-side member opposed to each other.

12. The coupling device according to claim 11, wherein
either said magnet rotator or said yoke-side member is formed to change the areas of said portions of said magnets of said magnet rotator and said yoke-side member opposed to each other by moving with respect to either said yoke-side member or said magnet rotator in said direction of the axis of rotation.

* * * * *